(12) United States Patent
Skudas

(10) Patent No.: US 11,590,434 B2
(45) Date of Patent: Feb. 28, 2023

(54) METHOD AND APPARATUS FOR CHROMATOGRAPHIC PURIFICATION

(71) Applicant: MERCK PATENT GMBH, Darmstadt (DE)

(72) Inventor: Romas Skudas, Mainz (DE)

(73) Assignee: Merck Patent GmbH, Darmstadt (DE)

(*) Notice: Subject to any disclaimer, the term of this patent is extended or adjusted under 35 U.S.C. 154(b) by 135 days.

(21) Appl. No.: 16/666,791

(22) Filed: Oct. 29, 2019

(65) Prior Publication Data
US 2020/0101399 A1 Apr. 2, 2020

Related U.S. Application Data

(62) Division of application No. 14/349,387, filed as application No. PCT/EP2012/003866 on Sep. 15, 2012.
(Continued)

(30) Foreign Application Priority Data

Oct. 4, 2011 (EP) ..................................... 11008021

(51) Int. Cl.
G01N 30/46 (2006.01)
B01D 15/18 (2006.01)
(Continued)

(52) U.S. Cl.
CPC ....... *B01D 15/361* (2013.01); *B01D 15/1864* (2013.01); *B01D 15/362* (2013.01);
(Continued)

(58) Field of Classification Search
CPC ........ B01D 15/00; B01D 15/08; B01D 15/18; B01D 15/1842; B01D 15/1864;
(Continued)

(56) References Cited

U.S. PATENT DOCUMENTS 5,164,159 A 11/1992 Hayashi et al.
6,139,746 A 10/2000 Kopf
(Continued)

FOREIGN PATENT DOCUMENTS

DE 2914807 A1 10/1980
EP 0332452 B1 6/1994
(Continued)

OTHER PUBLICATIONS

Office Action and form PTO 892 in co-pending U.S. Appl. No. 14/349,387 dated Dec. 16, 2019 (pp. 1-23).
(Continued)

*Primary Examiner* — Kara M Peo
(74) *Attorney, Agent, or Firm* — Millen, White, Zelano & Branigan, PC; Ryan Pool

(57) ABSTRACT

A method and an apparatus suitable for a continuous chromatography process which only needs three separation columns, and a two-step process containing two chromatographic steps, in which the first chromatographic step (capture) is performed alternating and sequentially on two separation columns, the second chromatographic step (polishing) is performed, also sequentially, on the third column.

6 Claims, 5 Drawing Sheets

Related U.S. Application Data

Figure 1:
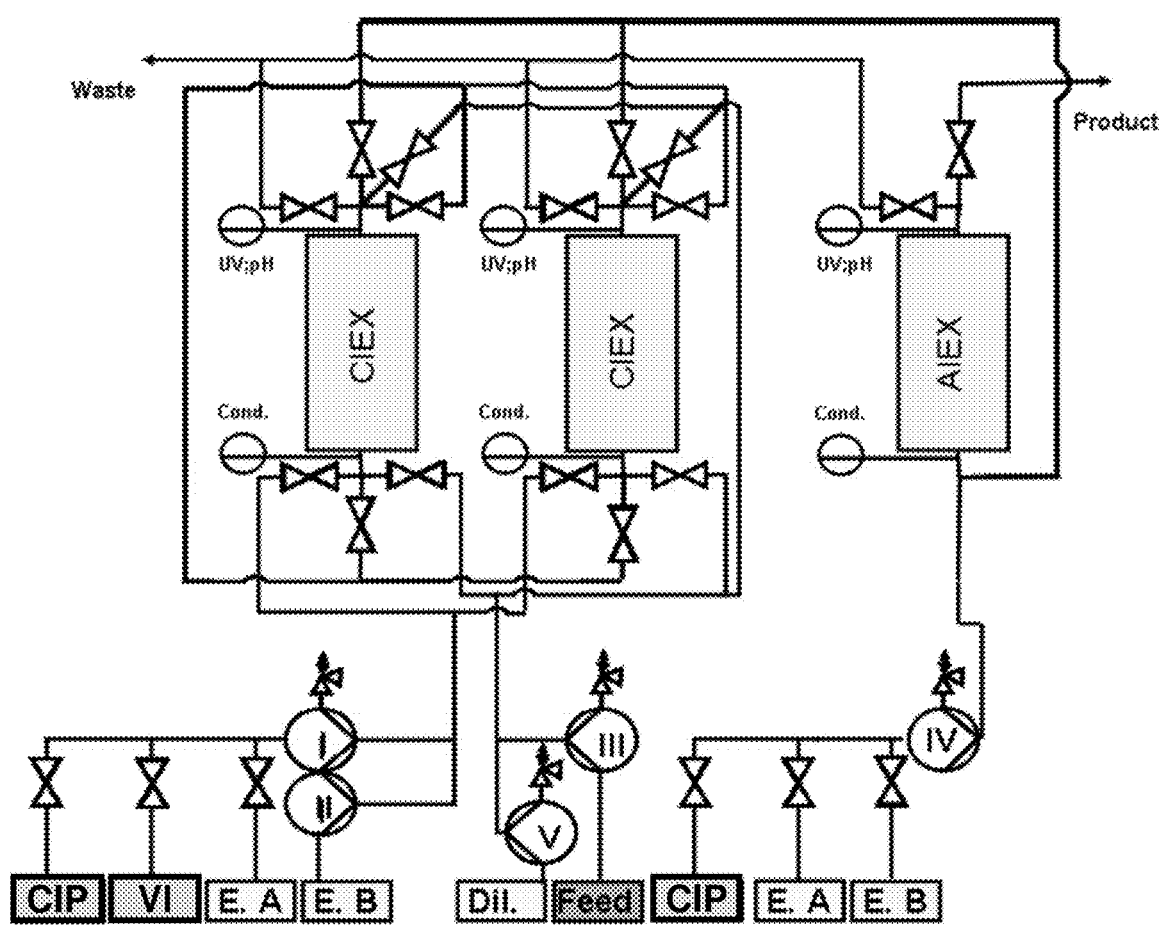

(60) Provisional application No. 61/666,338, filed on Jun. 29, 2012.

(51) Int. Cl.
  *G01N 30/88* (2006.01)
  *B01D 15/36* (2006.01)
  *B01D 15/38* (2006.01)
  *G01N 30/96* (2006.01)

(52) U.S. Cl.
  CPC ....... *B01D 15/363* (2013.01); *B01D 15/3804* (2013.01); *G01N 30/461* (2013.01); *G01N 30/467* (2013.01); *G01N 30/468* (2013.01); *G01N 30/96* (2013.01); *G01N 2030/8831* (2013.01)

(58) Field of Classification Search
  CPC ............ B01D 15/1871; B01D 15/1878; B01D 15/1885; B01D 15/361; B01D 15/362; B01D 15/363; B01D 15/3804; B01D 15/3809; B01D 15/3814; B01D 15/3819; B01D 15/3828; B01D 15/2823; G01N 30/48; G01N 30/6034; G01N 30/6043; G01N 30/46; G01N 30/461; G01N 30/463; G01N 30/466; G01N 30/468
  See application file for complete search history.

(56) References Cited

U.S. PATENT DOCUMENTS

| | | | |
|---|---|---|---|
| 6,375,851 B1 | 4/2002 | Sterling | |
| 7,504,076 B2 | 3/2009 | Mallet | |
| 8,536,316 B2 | 9/2013 | Soice et al. | |
| 9,024,000 B2 | 5/2015 | Jeon et al. | |
| 2002/0150926 A1 | 10/2002 | Jindal | |
| 2004/0241878 A1 | 12/2004 | Thommes et al. | |
| 2007/0077555 A1* | 4/2007 | Nowak | B01J 20/28004 435/5 |
| 2008/0044309 A1 | 2/2008 | Yamashita et al. | |
| 2008/0177048 A1* | 7/2008 | Gagnon | B01J 20/282 530/413 |
| 2008/0255027 A1 | 10/2008 | Moya | |
| 2009/0036651 A1 | 2/2009 | Moya | |
| 2009/0145203 A1 | 6/2009 | Vorm et al. | |
| 2009/0149638 A1 | 6/2009 | Ley et al. | |
| 2009/0218286 A1 | 9/2009 | Bisschops et al. | |
| 2009/0232737 A1 | 9/2009 | Moya | |
| 2011/0020327 A1 | 1/2011 | Moya | |
| 2011/0065901 A1 | 3/2011 | Soice et al. | |
| 2011/0073548 A1 | 3/2011 | Williams et al. | |
| 2011/0232373 A1 | 9/2011 | Desmet et al. | |
| 2012/0066633 A1 | 3/2012 | Saito | |
| 2020/0378934 A1 | 12/2020 | Bangtsson et al. | |
| 2021/0017561 A1 | 1/2021 | Ransohoff et al. | |

FOREIGN PATENT DOCUMENTS

| | | |
|---|---|---|
| EP | 1545574 B1 | 6/2005 |
| WO | 05001589 A1 | 1/2005 |
| WO | 2006046468 A1 | 5/2006 |
| WO | 2008091740 A2 | 7/2008 |
| WO | 2009/045897 A1 | 4/2009 |
| WO | 2010/072546 A1 | 7/2010 |
| WO | 10151214 A1 | 12/2010 |
| WO | 2011/017514 A1 | 2/2011 |
| WO | 2011/037522 A1 | 3/2011 |
| WO | 11136533 A2 | 11/2011 |
| WO | 12078677 A2 | 6/2012 |

OTHER PUBLICATIONS

Little C.J. et al.,"Application of a Microprocessor-Controlled Valve Switching Unit . . . " ; J. of Chromatography, 1983, vol. 264, pp. 183-196.

Opposition issued Aug. 30, 2019 in the corresponding Indian Examination Procedure 946/KOLNP/2014 (pp. 1-92).

International Search Report dated Nov. 22, 2012 issued in corresponding PCT/EP2012/003866 application (pp. 1-5).

I. Francois et al., "Comprehensive Two-Dimensional Liquid Chromatography Applying Two Parallel Columns in the Second Dimension", Journal of Chromatography A, vol. 1178, No. 1-2 (2008) pp. 33-42.

J.N. Fairchild et al., "Theoretical Advantages and Drawbacks of On-Line, Multidimensional Liquid Chromatography Using Multiple Columns Operated in Parallel", Journal of Chromatography A, vol. 1216, No. 34 (2009) pp. 6210-6217.

M.R. Filgueira et al., "Improving Peak Capacity in Fast Online Comprehensive Two-Dimensional Liquid Chromatography with Post-First-Dimension Flow Splitting", Analytical Chemistry, vol. 83, No. 24 (2011) pp. 9531-9539.

Extract from the Register of European Patents in EP2763771 opposition (2 pages), Nov. 14, 2018.

Chandra Mohan—A Guide for the Preparation and Use of Buffers in Biological Systems, Calbiochem Corporation. (1975), pp. 1-37.

Opposition for related European Patent Application No. 12759658.3 dated Mar. 14, 2017.

Gottschlich, Norbert et al., "Purification of monoclonal antibodies by simulated moving-bed chromatography", Journal of Chromatography A. 765 (1997), pp. 201-206.

Mun, Sungyong et al., "Optimal Design of a Size-Exclusion Tandem Simulated Moving Bed for Insulin Purification"., Ind. Eng. Chem. Res. 2003, 42, pp. 1977-1993.

Chin, Chim Yong et al., Simulated Moving Bed Equipment Designs, Separation & Purification Reviews, vol. 33, No. 2, pp. 77-155, 2004.

Temesvari, K. et al., "Quasi-Continuous Elution Chromatographic Purification of a Steroid Active Compound", Hungarian Journal of Industrial Chemistry, 2006, vol. 34, pp. 15-20.

"Low pH virus inactivation performed on a chromatography column", Database ip.com, Database accession No. PCOM000183319D, IP.com Electronic Publication Date: May 18, 2009.

Office Action dated Jul. 27, 2016 issued in corresponding JP 2014-533782 application (4 pages).

* cited by examiner

METHOD AND APPARATUS FOR CHROMATOGRAPHIC PURIFICATION

The present invention relates to a method and an apparatus suitable for a continuous chromatography process which only needs three separation columns. The process is a two step procedure comprising two chromatographic steps. The first chromatographic step (capture) is performed alternating and sequentially on preferably two separation columns, the second chromatographic step (polishing) is performed, also sequentially, on the third column.

BACKGROUND OF THE INVENTION

The large-scale, economic purification of proteins is increasingly an important problem for the biotechnology and pharmaceutical industry. Typically, proteins are produced by cell culture, using either mammalian or bacterial cell lines engineered to produce the protein of interest by insertion of a recombinant plasmid containing the gene for that protein. Since the cell lines used are living organisms, they must be fed with a complex growth medium, containing sugars, amino acids, and growth factors, usually supplied from preparations of animal serum. Separation of the desired protein from the mixture of compounds fed to the cells and from the by-products of the cells themselves to a purity sufficient for use as a human therapeutic poses a formidable challenge.

Procedures for purification of proteins from cell debris initially depend on the site of expression of the protein. Some proteins are caused to be secreted directly from the cell into the surrounding growth media; others are made intracellularly. For the latter proteins, the first step of a purification process involves lysis of the cell, which can be done by a variety of methods, including mechanical shear, osmotic shock, or enzymatic treatments. Such disruption releases the entire contents of the cell into the homogenate, and in addition produces subcellular fragments that are difficult to remove due to their small size. These are generally removed by centrifugation or by filtration. The same problem arises, although on a smaller scale, with directly secreted proteins due to the natural death of cells and release of intracellular host cell proteins in the course of the protein production run.

As a consequence, typical purification processes that are presently used include the following steps:
 cell lysis to recover an intracellular protein or recovery of a protein from the media in case of a secreted protein
 removal of cellular debris using e.g. differential centrifugation or filtration to obtain a clarified sample containing the protein of interest
 use of a variety of chromatography media in a multi-step process to separate the protein of interest from other proteins and the various other impurities in the sample.

The chromatographic techniques typically separate mixtures of proteins on the basis of their charge, degree of hydrophobicity, or size. Several different chromatography resins are available for each of these techniques, allowing accurate tailoring of the purification scheme to the particular protein involved. The essence of each of these separation methods is that proteins can be caused either to move at different rates down a long column, achieving a physical separation that increases as they pass further down the column, or to adhere selectively to the separation medium, being then differentially eluted by different solvents. In some cases, the desired protein is separated from impurities when the impurities specifically adhere to the column, and the protein of interest does not, that is, the protein of interest is present in the "flow-through."

Ion-exchange chromatography, named for the exchangeable counterion, is a procedure applicable to purification of ionizable molecules. Ionized molecules are separated on the basis of the non-specific electrostatic interaction of their charged groups with oppositely charged molecules attached to the solid phase support matrix, thereby retarding those ionized molecules that interact more strongly with solid phase. The net charge of each type of ionized molecule, and its affinity for the matrix, varies according to the number of charged groups, the charge of each group, and the nature of the molecules competing for interaction with the charged solid phase matrix. These differences result in resolution of various molecule types by ion-exchange chromatography. In typical protein purification using ion exchange chromatography, a mixture of many proteins derived from a host cell, such as in mammalian cell culture, is applied to an ion-exchange column. After non-binding molecules are washed away, conditions are adjusted, such as by changing pH, counter ion concentration and the like in step- or gradient-mode, to release from the solid phase a non-specifically retained or retarded ionized protein of interest and separating it from proteins having different charge characteristics. Anion exchange chromatography involves competition of an anionic molecule of interest with the negative counter ion for interaction with a positively charged molecule attached to the solid phase matrix at the pH and under the conditions of a particular separation process. By contrast, cation exchange chromatography involves competition of a cationic molecule of interest with the positive counter ion for a negatively charged molecule attached to the solid phase matrix at the pH and under the conditions of a particular separation process. Mixed mode ion exchange chromatography involves the use of a combination of cation and anion exchange chromatographic media in the same step. In particular, "mixed-mode" refers to a solid phase support matrix to which is covalently attached a mixture of cation exchange and/or anion exchange and hydrophobic interaction moieties.

Affinity chromatography, which exploits a specific structurally dependent (i.e., spatially complementary) interaction between the protein to be purified and an immobilized capture agent, is a standard purification option for some proteins, such as antibodies. Protein A, for example, is a useful adsorbent for affinity chromatography of proteins, such as antibodies, which contain an Fc region. Protein A is a 41 kD cell wall protein from *Staphylococcus aureas* which binds with a high affinity (about $10^{-8}$M to human IgG) to the Fc region of antibodies. Despite its common use, affinity chromatography is costly, particularly at the industrial scale necessary to purify therapeutic proteins.

Further chromatographic methods are Hydroxyapatite chromatography or Hydrophobic interaction chromatography (HIC).

Consequently, typical purification processes include different centrifugation and filtration steps as well as at least 3 chromatographic separation techniques such as affinity chromatography (AC), gel permeation chromatography (GPC), ion exchange chromatography (IEC), hydrophobic interaction chromatography (HIC), reversed phase chromatography (RPC), and normal phase chromatography (NPC). Usually each of named techniques requires different operation (buffer, pH, conductivity) conditions that lead to sample preparation before chromatographic separation implementation. A more efficient and economic purification process might be achieved by eliminating the sample folding/preparation steps in between the purification steps by direct combination of various chromatographic modes in one purification train.

Simple batch chromatography technique is well accepted in the industrial applications, however this technology is expensive due to long processing times and high operation costs (e.g. large solvent amounts, expensive resins and hardware). This technique is also sensitive to operational conditions (e.g. product titer, residence time and feeding rate (product losses starting from 80% dynamic binding capacity values).

Some alternative semi-continuous technologies were developed as well, meaning that they connect two or three different chromatography modes, but do not allow one to have a continuous feed.

WO 2011/037522 discloses a separation system comprising at least two separation units which are connected outlet to inlet. All columns are connected in line.

WO 2011/017514 discloses the combination of an affinity chromatography step and two ion exchange chromatography steps without the need for holding tanks or buffer exchange steps.

But there is still a need for a more efficient and economical solution.

BRIEF DESCRIPTION OF THE INVENTION

Surprisingly, we found a system that not only enables the connection of separation units (columns) but also enables a continuous feed. This is achieved by providing at least two capture columns.

The present invention is thus directed to an apparatus comprising
- two separation units A1 and A2 both having the same chromatography matrix and a separation unit B having a chromatography matrix which differs form the chromatography matrix of separation units A1 and A2, all separation units having a fluid inlet and a fluid outlet, whereby there is at least fluid connection between the fluid outlet of separation unit A1 and the fluid inlet of separation unit B and fluid connection between the fluid outlet of separation unit A2 and the fluid inlet of separation unit B (connecting line C-P in FIGS. 2, 3 and 4)
- at least one valve in the fluid connection between separation columns A1 and A2 and separation column B that allows to switch between fluid communication between the fluid outlet of separation column A1 and the fluid inlet of separation column B and fluid communication between the fluid outlet of separation column A2 and the fluid inlet of separation column B.
- at least two buffer reservoirs and at least two pumps whereby the buffer reservoirs are at least in fluid connection with the inlets of separation units A1 and A2 and the pumps are used to transport the liquid from the reservoirs to the separation units.
- a reservoir containing sample solution (sample feed), that is in fluid connection with the inlet of separation units A1 and A2

In one embodiment, the separation units A1 and A2 have an affinity chromatography, a cation exchange, an anion exchange chromatography matrix or a mixed mode cation exchange matrix.

In another embodiment, the separation unit B has a cation exchange, a mixed mode anion exchange or an anion exchange chromatography matrix.

In another embodiment, the separation unit B has a mixture of matrixes including a cation exchange and an anion exchange chromatography matrix or a cation and a mixed mode anion exchange matrix or a mixed mode cation exchange matrix and an anion exchange matrix.

In a preferred embodiment, the separation units A1 and A2 have an affinity chromatography matrix and the separation unit B has a cation exchange chromatography matrix.

In another preferred embodiment, the separation units A1 and A2 have an affinity chromatography matrix and the separation unit B has an anion exchange or a mixed mode anion exchange chromatography matrix.

In another embodiment, the separation units A1 and A2 have an affinity chromatography matrix and the separation unit B has a mixture of an anion exchange and cation exchange chromatography matrix.

In another embodiment, the separation units A1 and A2 have an affinity chromatography matrix and the separation unit B has a mixture of an anion exchange and a mixed mode cation exchange chromatography matrix or a mixture of an cation exchange and a mixed mode anion exchange chromatography matrix or a mixture of a mixed mode cation exchange and a mixed mode anion exchange chromatography matrix.

In another preferred embodiment, the separation units A1 and A2 have a cation exchange or a mixed mode cation exchange chromatography matrix and the separation unit B has an anion exchange or a mixed mode anion exchange chromatography matrix.

In another embodiment, the separation units A1 and A2 have an anion exchange or a mixed mode anion exchange chromatography matrix and the separation unit B has a cation exchange or a mixed mode cation exchange chromatography matrix.

In another preferred embodiment, two separation units A1 and A2 both have at least one fluid selection valve at the separation unit outlet, whereby at least one channel of the fluid selection valves at the outlets of separation units A1 and A2 is connected with the inlet of separation unit B (via a connecting line), enabling the control (start and stop) of a fluid communication between the separation unit A1 and separation unit B and between the separation unit A2 and separation unit B.

In another preferred embodiment, the separation unit B has a fluid selection valve at the separation unit outlet.

In another preferred embodiment, the separation units A1 and A2 both have at least one fluid selection valve at the separation unit inlet.

In a preferred embodiment, the apparatus further comprises a connecting line between the fluid outlet of separation unit A1 and the fluid inlet of separation unit A2 and a connecting line between the fluid outlet of separation unit A2 and the fluid inlet of separation unit A1 (connecting lines F-F in FIGS. 2, 3 and 4), thus enabling a fluid communication between the outlet of separation unit A1 and the inlet of separation unit A2 as well as a fluid communication between the outlet of separation unit A2 and the inlet of separation unit A1. In a very preferred embodiment, at least one valve is located in the connecting line between the outlet of separation unit A1 and the inlet of separation unit A2 and at least one valve is located in the connecting line between the outlet of separation unit A2 and the inlet of separation unit A1. Typically the valves are located close to the outlets of separation units A1 and A2 and/or close to the inlets of separation units A1 and A2.

In another preferred embodiment, the apparatus comprises two connecting lines between the fluid outlet of separation unit A1 and the fluid inlet of separation unit A2 and two connecting lines between the fluid outlet of separation unit A2 and the fluid inlet of separation unit A1 (connecting lines F-F and W-F in FIG. 4), thus enabling a fluid communication between the outlet of separation unit A1 and the inlet of separation unit A2 as well as a fluid communication between the outlet of separation unit A2 and the inlet of separation unit A1. In a very preferred embodiment, valves are located close to the inlet and outlet of separation units A1 and A2 and the connecting lines start from these valves.

In another preferred embodiment, at least two buffer reservoirs are in fluid connection with the inlets of separation units A1 and A2. One or more valves and/or additional fluid inlets might be located in the connecting line between the buffer reservoirs and the inlets of separation units A1 and A2.

In another preferred embodiment, the apparatus further comprises one or more additional fluid inlets prior to the fluid inlets of separation units A2 and A1, preferably to a connecting line between the fluid outlet of separation unit A2 and the fluid inlet of separation unit A1 and to a connecting line between the fluid outlet of separation unit A1 and the fluid inlet of separation unit A2.

In another preferred embodiment, the apparatus comprises an additional fluid inlet prior to the fluid inlet of column B that means, preferably a connecting line to one or more reservoirs is located prior to the fluid inlet of column B in the connecting line between the outlets of columns A1 and A2 and the inlet of column B.

In another preferred embodiment, the apparatus comprises an additional reservoir with virus inactivation buffer that is at least in fluid connection with the inlet of one of the three separation units.

The present invention is further directed to a continuous method of purifying a target molecule from one or more impurities in a sample, the method comprising the steps of
  alternately loading the sample on the separation units A1 and A2 so that while the sample is loaded on separation unit A1 wherein the sample is at a first pH and conductivity enabling the target molecule to be bound to separation unit A1, separation unit A2 is at least partly in fluid communication with separation unit B so that the target molecule loaded on separation unit A2 is eluted onto separation unit B and separation unit A2 is re-equilibrated and while the sample is loaded on separation unit A2 wherein the sample is at a first pH and conductivity enabling the target molecule to be bound to separation unit A2, separation unit A1 is at least partly in fluid communication with separation unit B so that the target molecule is eluted onto separation unit B and separation unit A1 is re-equilibrated
  recovering the target molecule from the fluid outlet of separation unit B.

In a preferred embodiment, the target molecule is an antibody.

In a preferred embodiment, the sample is continuously loaded alternately to either separation unit A1 or separation unit A2.

In another embodiment, separation units A1 and A2 are run in the bind and elute mode and separation unit B is run in the flow through mode.

In another preferred embodiment, while loading the sample onto separation unit A1 the fluid outlet of separation unit A1 is at least partly in fluid communication with the fluid inlet of separation unit A2 to enable the capture of the starting to leach target molecule from the separation unit A1 to be bound to separation unit A2. And while loading the sample onto separation unit A2 the fluid outlet of separation unit A2 is preferably at least partly in fluid communication with the fluid inlet of separation unit A1 to enable the capture of the starting to leach target molecule from the separation unit A2 to be bound to separation unit A1.

In another preferred embodiment, while washing the unbound sample from the separation unit A1, separation unit A2 is at least partly in fluid communication with the reservoir containing sample solution and separation unit A1. That means separation unit A2 is simultaneously loaded with unbound sample that is eluted from unit A1 and with sample solution coming from the reservoir.

And while washing the unbound sample from the separation unit A2, separation unit A1 is in fluid communication with the reservoir containing sample solution and separation unit A2.

In another preferred embodiment, while separation unit B is in fluid communication with separation unit A1, it is also in fluid communication with a buffer reservoir.

And while separation unit B is in fluid communication with separation unit A2, it is also in fluid communication with a buffer reservoir.

In a preferred embodiment, a virus inactivation buffer is pumped through separation units A1 and A2 after loading the units with the target molecule.

In another embodiment, if separation unit B is run in the bind/elute mode, a virus inactivation buffer is pumped through separation unit B after loading the unit with the target molecule.

In a preferred embodiment, the sample subjected to the method of the present invention is a clarified sample. That means prior to loading the sample on separation unit A1 or A2 it is clarified by subjecting it to one or more of the following: centrifugation, filtration and/or settling.

In a very preferred embodiment, the sample is treated with a precipitant prior to clarification by centrifugation, filtration and/or settling.

FIGURES

FIG. 1 shows a schematic view of a preferred embodiment of the apparatus according to the present invention. It shows the two capture separation units (CIEX), one polishing separation unit (AIEX), the reservoirs (CIP, VI, E.A, E.B, Dil., Feed, CIP, E.A, E. B) as well as the connecting lines, valves, pumps and detectors.

Figure 2:
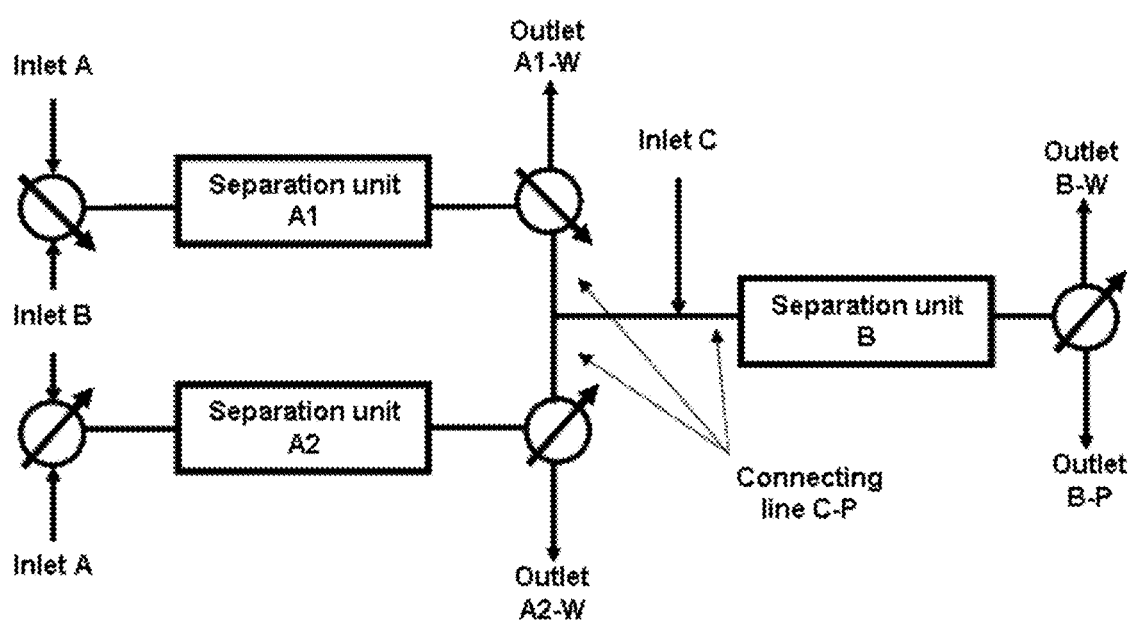
Figure 3:
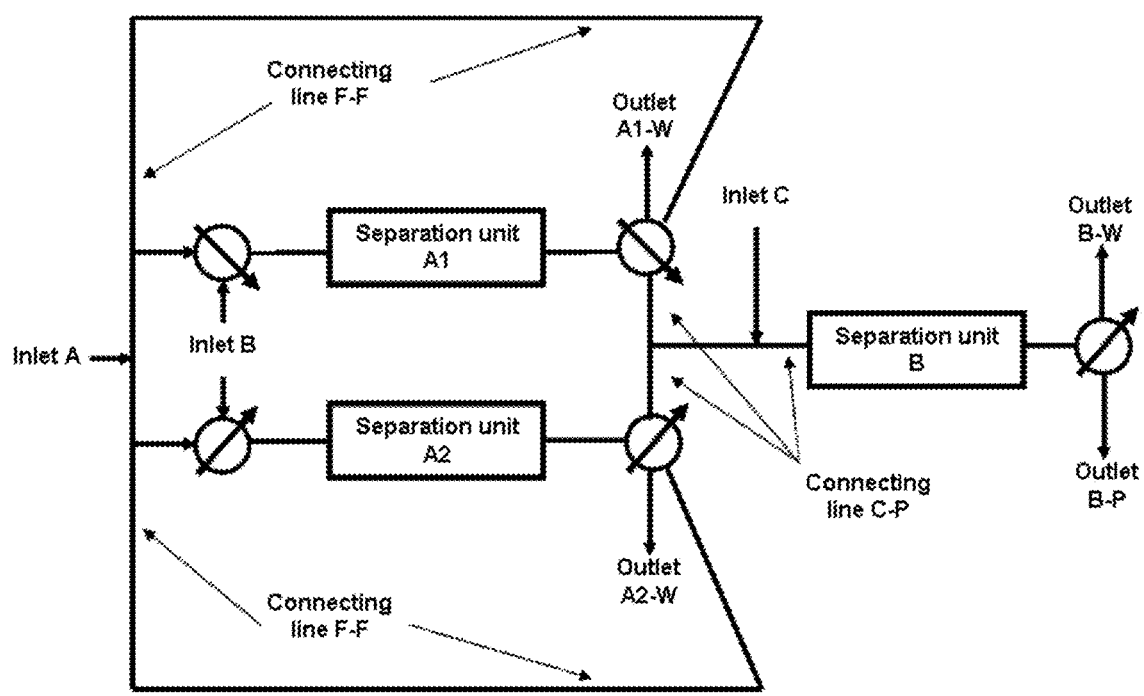
Figure 4:
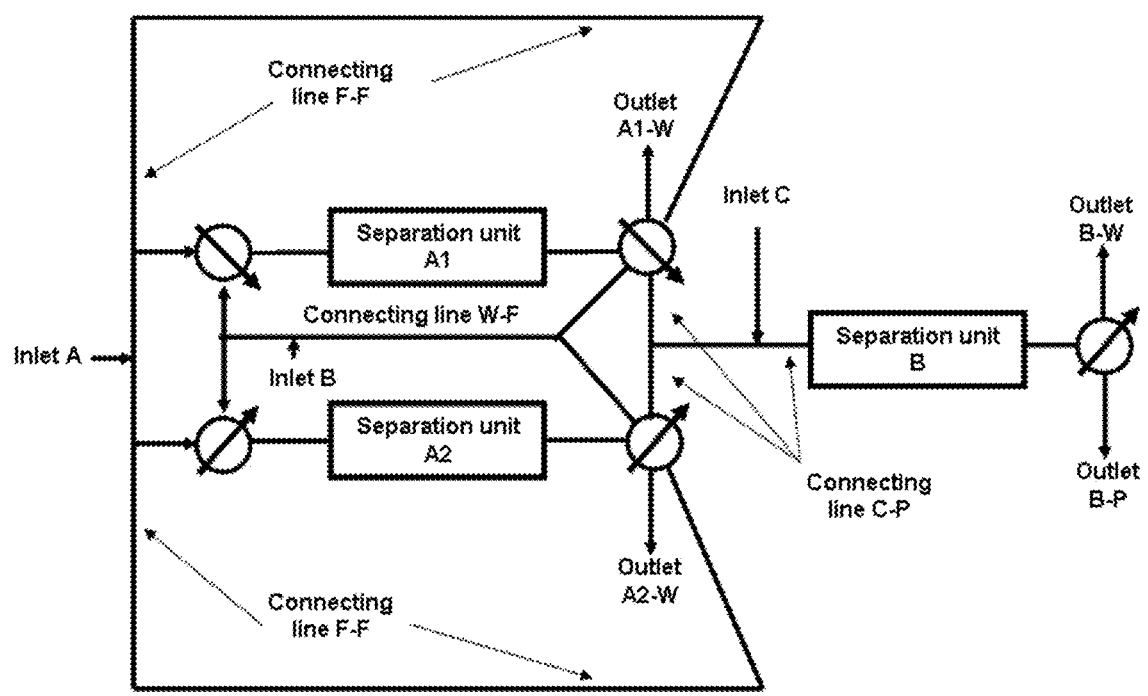

FIGS. 2, 3 and 4 schematically show different embodiments of the apparatus according to the invention. FIG. 2 shows a setup that is mainly restricted to the essential features but e.g. has an additional fluid inlet prior to separation unit B (inlet C). FIG. 3 shows a setup that additionally comprises fluid connection between the outlet of separation unit A1 and the inlet of separation unit A2 as well as fluid connection between the outlet of separation unit A2 and the inlet of separation unit A2 (connecting line F-F). FIG. 4 shows a setup with two connecting lines that allow fluid connection between the outlet of separation unit A1 and the inlet of separation unit A2 as well as two connecting lines that allow fluid connection between the outlet of separation unit A2 and the inlet of separation unit A2 (connecting line F-F, connecting line W-F).

Figure 5:
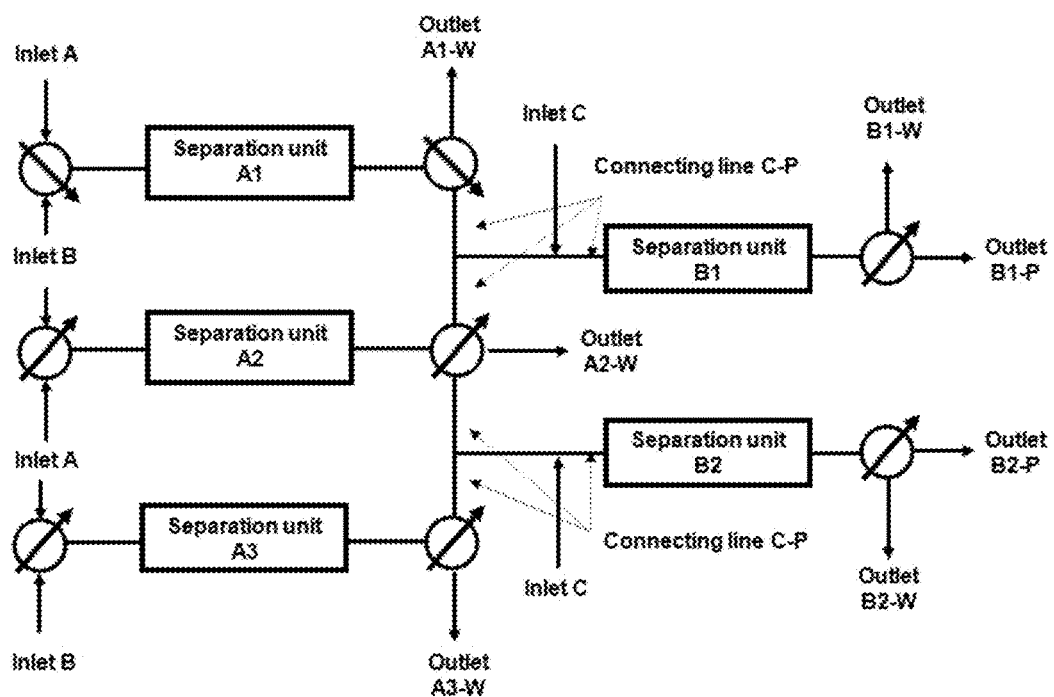

FIG. 5 shows an embodiment of the apparatus according to the invention with three capture separation units A1, A2 and A3 and two polishing separation units B1 and B2.

In the embodiment of FIG. 5, the washing and reequilibration steps are done while connecting the separation unit A3 with Outlet A3-W and the named elution step is done while connecting the separation unit A3 with separation unit B2 (e.g. anion exchange media) through connecting line C-P directly to transfer the target molecule to separation unit B, while a separation unit B2 is connected with inlet C (e.g. solvent delivery system) for the feeding of target molecule from the separation unit A3 at the conditions that enable the target molecule to be bound to separation unit B2, washing with buffer B, elution of the target molecule with buffer A and reequilibration with buffer B. The feeding, washing and reequilibration steps are done while connecting the separation unit B1 with Outlet B1-W and elution step is done while connecting the separation unit B1 with Outlet B1-P to withdraw the purified target molecule (e.g. antibody), while correspondingly, the feeding, washing and reequilibration steps are done while connecting the separation unit B2 with Outlet B2-W and elution step is done while connecting the separation unit B2 with Outlet B2-P to withdraw the purified target molecule (e.g. antibody).

Definitions

Before describing the present invention in detail, it is to be understood that this invention is not limited to specific compositions or process steps, as such may vary. It must be noted that, as used in this specification and the appended claims, the singular form "a", "an" and "the" include plural referents unless the context clearly dictates otherwise. Thus, for example, reference to "a ligand" includes a plurality of ligands and reference to "an antibody" includes a plurality of antibodies and the like.

Unless defined otherwise, all technical and scientific terms used herein have the same meaning as commonly understood by one of ordinary skill in the art to which this invention is related. The following terms are defined for purposes of the invention as described herein.

As used herein the term "target molecule" refers to any molecule, substance or compound or mixtures thereof that shall be isolated, separated or purified from one or more impurities in a sample. In a preferred embodiment, the target molecule is a protein or a mixture of two or more proteins. In a very preferred embodiment, the target molecule is an antibody.

The term "antibody" refers to a protein which has the ability to specifically bind to an antigen. Typically, antibodies are having a basic four-polypeptide chain structure consisting of two heavy and two light chains, said chains being stabilized, for example, by interchain disulfide bonds. Antibodies may be monoclonal or polyclonal and may exist in monomeric or polymeric form, for example, IgM antibodies which exist in pentameric form and/or IgA antibodies which exist in monomeric, dimeric or multimeric form. Antibodies may also include multispecific antibodies (e.g., bispecific antibodies), and antibody fragments so long as they retain, or are modified to comprise, a ligand-specific binding domain. The term "fragment" refers to a part or portion of an antibody or antibody chain comprising fewer amino acid residues than an intact or complete antibody or antibody chain. Fragments can be obtained via chemical or enzymatic treatment of an intact or complete antibody or antibody chain. Fragments can also be obtained by recombinant means. When produced recombinantly, fragments may be expressed alone or as part of a larger protein called a fusion protein. Exemplary fragments include Fab, Fab', F(ab')2, Fc and/or Fv fragments. Exemplary fusion proteins include Fc fusion proteins. According to the present invention fusion proteins are also encompassed by the term "antibody".

As discussed above, in some embodiments, an antibody is an Fc region containing protein, e.g., an immunoglobulin. In some embodiments, an Fc region containing protein is a recombinant protein which includes the Fc region of an immunoglobulin fused to another polypeptide or a fragment thereof. Exemplary polypeptides include, e.g., renin; a growth hormone, including human growth hormone and bovine growth hormone; growth hormone releasing factor; parathyroid hormone; thyroid stimulating hormone; lipoproteins; α-1-antitrypsin; insulin α-chain; insulin β-chain; pro-insulin; follicle stimulating hormone; calcitonin; luteinizing hormone; glucagon; clotting factors such as factor VIIIC, factor IX, tissue factor, and von Willebrands factor; anti-clotting factors such as Protein C; atrial natriuretic factor; lung surfactant; a plasminogen activator, such as urokinase or human urine or tissue-type plasminogen activator (t-PA); bombesin; thrombin; hemopoietic growth factor; tumor necrosis factor-α and -β; enkephalinase; RANTES (regulated on activation normally T-cell expressed and secreted); human macrophage inflammatory protein (MIP-1-α); a serum albumin such as human serum albumin; Muellerian-inhibiting substance; relaxin α-chain; relaxin β-chain; pro-relaxin; mouse gonadotropin-associated peptide; a microbial protein, such as β-lactamase; DNase; IgE; a cytotoxic T-lymphocyte associated antigen (CTLA) (e.g., CTLA-4); inhibin; activin; vascular endothelial growth factor (VEGF); receptors for hormones or growth factors; Protein A or D; rheumatoid factors; a neurotrophic factor such as bone-derived neurotrophic factor (BDNF), neurotrophin-3, -4, -5, or -6 (NT-3, NT-4, NT-5, or NT-6), or a nerve growth factor such as NGF-β; platelet-derived growth factor (PDGF); fibroblast growth factor such as αFGF and βFGF; epidermal growth factor (EGF); transforming growth factor (TGF) such as TGF-alpha and TGF-β, including TGF-β1, TGF-β2, TGF-β3, TGF-β4, or TGF-β5; insulin-like growth factor-I and -II (IGF-I and IGF-II); des(I-3)-IGF-I (brain IGF-I), insulin-like growth factor binding proteins (IGFBPs); CD proteins such as CD3, CD4, CD8, CD 19 CD20, CD34, and CD40; erythropoietin; osteoinductive factors; immunotoxins; a bone morphogenetic protein (BMP); an interferon such as interferon-α, -β, and -γ; colony stimulating factors (CSFs), e.g., M-CSF, GM-CSF, and G-CSF; interleukins (ILs), e.g., IL-I to IL-IO; superoxide dismutase; T-cell receptors; surface membrane proteins; decay accelerating factor; viral antigen such as, for example, a portion of the AIDS envelope; transport proteins; homing receptors; addressins; regulatory proteins; integrins such as CDI Ia, CDI Ib, CDI Ic, CD 18, an ICAM, VLA-4 and VCAM; a tumor associated antigen such as HER2, HER3 or HER4 receptor; and fragments and/or variants of any of the above-listed polypeptides. In addition, an antibody according to the present invention is any protein or polypeptide, fragment or variant thereof, that binds specifically to any of the above-listed polypeptides.

As used herein, and unless stated otherwise, the term "sample" refers to any composition or mixture that contains a target molecule. Samples may be derived from biological or other sources. Biological sources include eukaryotic and prokaryotic sources, such as plant and animal cells, tissues and organs. The sample may also include diluents, buffers, detergents, and contaminating species, debris and the like that are found mixed with the target molecule. The sample may be "partially purified" (i.e., having been subjected to one or more purification steps, such as filtration steps) or may be obtained directly from a host cell or organism producing the target molecule (e.g., the sample may comprise harvested cell culture fluid).

The term "impurity" or "contaminant" as used herein, refers to any foreign or objectionable molecule, including a biological macromolecule such as DNA, RNA, one or more host cell proteins, endotoxins, lipids and one or more additives which may be present in a sample containing the target molecule that is being separated from one or more of the foreign or objectionable molecules using a process of the present invention. Additionally, such impurity may include any reagent which is used in a step which may occur prior to the method of the invention.

The terms "purifying," "separating," or "isolating," as used interchangeably herein, refer to increasing the degree of purity of a target molecule from a composition or sample comprising the target molecule and one or more impurities. Typically, the degree of purity of the target molecule is increased by removing (completely or partially) at least one impurity from the composition.

The terms "flow-through process," "flow-through mode," and "flow-through chromatography," as used interchangeably herein, refer to a product separation technique in which at least one product {e.g., an Fc region containing protein) contained in a sample along with one or more contaminants is intended to flow through a chromatographic resin or media, while at least one potential contaminant or impurity binds to the chromatographic resin or media. The "flow-through mode" is generally an isocratic operation (i.e., a chromatography process during which the composition of the mobile phase is not changed).

In some embodiments according to the claimed methods and as described in the Examples set forth herein, the methods e.g. employ an anion and/or cation exchange chromatography step which is performed in a flow-through mode.

The terms "bind and elute mode" and "bind and elute process," as used interchangeably herein, refer to a product separation technique in which at least one product (target molecule) contained in a sample (e.g., an Fc region containing protein) binds to a chromatographic resin or media and is subsequently eluted.

As used herein, the term "reservoir" as used herein, refers to any container, tank or bag, which may be used to store any buffer to be used when performing the method of the invention or the sample or any other liquid that shall be used in the method of the invention. Additionally a "reservoir" is any container, tank or bag that is used to collect the output of a process step (e.g., an eluate from a column).

As used herein, the term "inline dilution" refers to a buffer exchange step or an in-line solution condition adjustment, which is typically an alternative in many conventional processes, to the use of a holding tank. In a typical inline dilution, two solutions can be mixed or titrated during transfer using solution blending in a pipe or mixing vessel, filtration device or apparatus. For example, a solution may be required to be diluted in order to reduce conductivity by blending the solution with another lower conductivity solution. Buffer exchange can be accomplished with the help of filtration devices, such as diafiltration, ultrafiltration and the like. In some embodiments according to the claimed invention, the methods provide an improved process for purifying proteins, which eliminates the need for a buffer exchange step.

The term "chromatography" refers to any kind of technique which separates an analyte of interest (e.g. a target molecule) from other molecules present in a mixture. Usually, the target molecule is separated from other molecules as a result of differences in rates at which the individual molecules of the mixture migrate through a stationary medium under the influence of a moving phase, or in bind and elute processes.

The term "matrix" or "chromatography matrix" are used interchangeably herein and refer to any kind of sorbent, resin or solid phase which in a separation process separates a target molecule (e.g., an Fc region containing protein such as an immunoglobulin) from other molecules present in a mixture. Usually, the target molecule is separated from other molecules as a result of differences in rates at which the individual molecules of the mixture migrate through the matrix under the influence of a moving phase, or in bind and elute processes. Non-limiting examples include particulate, monolithic or fibrous resins as well as membranes that can be put in columns or cartridges. Examples of materials for forming the matrix include polysaccharides (such as agarose and cellulose); and other mechanically stable matrices such as silica (e.g. controlled pore glass), poly(styrenedivinyl) benzene, polyacrylamide, ceramic particles and derivatives of any of the above. Examples for typical matrix types suitable for the method of the present invention are cation exchange resins, affinity resins, anion exchange resins or mixed mode resins.

A "ligand" is a functional group that is attached to the chromatography matrix and that determines the binding properties of the matrix. Examples of "ligands" include, but are not limited to, ion exchange groups, hydrophobic interaction groups, hydrophilic interaction groups, thiophilic interactions groups, metal affinity groups, affinity groups, bioaffinity groups, and mixed mode groups (combinations of the aforementioned). Some preferred ligands that can be used herein include, but are not limited to, strong cation exchange groups, such as sulphopropyl, sulfonic acid; strong anion exchange groups, such as trimethylammonium chloride; weak cation exchange groups, such as carboxylic acid; weak anion exchange groups, such as $N_5N$ diethylamino or DEAE; hydrophobic interaction groups, such as phenyl, butyl, propyl, hexyl; and affinity groups, such as Protein A, Protein G, and Protein L.

The term "affinity chromatography" refers to a protein separation technique in which a target protein (e.g., an Fc region containing protein of interest or antibody) is specifically bound to a ligand which is specific for the target protein. Such a ligand is generally referred to as a biospecific ligand. In some embodiments, the biospecific ligand (e.g., Protein A or a functional variant thereof) is covalently attached to a chromatography matrix material and is accessible to the target protein in solution as the solution contacts the chromatography matrix. The target protein generally retains its specific binding affinity for the biospecific ligand during the chromatographic steps, while other solutes and/or proteins in the mixture do not bind appreciably or specifically to the ligand. Binding of the target protein to the immobilized ligand allows contaminating proteins or protein impurities to be passed through the chromatography matrix while the target protein remains specifically bound to the immobilized ligand on the solid phase material. The specifically bound target protein is then removed in active form from the immobilized ligand under suitable conditions (e.g., low pH, high pH, high salt, competing ligand etc.), and passed through the chromatographic column with the elution buffer, free of the contaminating proteins or protein impurities that were earlier allowed to pass through the column. Any component can be used as a ligand for purifying its respective specific binding protein, e.g. antibody. However, in various methods according to the present invention, Protein A is used as a ligand for an Fc region containing target protein. The conditions for elution from the biospecific ligand (e.g., Protein A) of the target protein (e.g., an Fc region containing protein) can be readily determined by one of ordinary skill in the art. In some embodiments, Protein A or Protein L or a functional variant thereof may be used as a biospecific ligand. In some embodiments, a biospecific ligand such as Protein A is used at a pH range of 5-9 for binding to an Fc region containing protein, washing or re-equilibrating the biospecific ligand/target protein conjugate, followed by elution with a buffer having pH about or below 4 which contains at least one salt.

The term "ion-exchange" and "ion-exchange chromatography" refers to the chromatographic process in which a solute or analyte of interest (e.g., an Fc region containing target protein) in a mixture interacts with a charged compound linked (such as by covalent attachment) to a solid phase ion exchange material such that the solute or analyte of interest interacts non-specifically with the charged compound more or less than solute impurities or contaminants in the mixture. The contaminating solutes in the mixture elute from a column of the ion exchange material faster or slower than the solute of interest or are bound to or excluded from the resin relative to the solute of interest. "Ion-exchange chromatography" specifically includes cation exchange, anion exchange, and mixed mode ion exchange chromatography. For example, cation exchange chromatography can bind the target molecule (e.g., an Fc region containing target protein) followed by elution (cation exchange bind and elution chromatography or "CIEX") or can predominately bind the impurities while the target molecule "flows through" the column (cation exchange flow through chromatography FT-CIEX). Anion exchange chromatography can bind the target molecule (e.g., an Fc region containing target protein) followed by elution or can predominately bind the impurities while the target molecule "flows through" the column. In some embodiments and as demonstrated in the Examples set forth herein, the anion exchange chromatography step is performed in a flow through mode.

The phrase "ion exchange matrix" refers to a chromatography matrix that is negatively charged (i.e. a cation exchange resin) or positively charged (i.e. an anion exchange resin). The charge may be provided by attaching one or more charged ligands to the matrix, e.g. by covalent linking. Alternatively, or in addition, the charge may be an inherent property of the matrix (e.g. as is the case for silica, which has an overall negative charge).

A "cation exchange matrix" refers to a chromatography matrix which is negatively charged, and which thus has free cations for exchange with cations in an aqueous solution passed over or through the solid phase. A negatively charged ligand attached to the solid phase to form the cation exchange resin may, e.g., be a carboxylate or sulfonate. Commercially available cation exchange resins include carboxy-methyl-cellulose, sulphopropyl (SP) immobilized on agarose (e.g., SP-SEPHAROSE® Fast Flow or SP-SEPHAROSE® High Performance, from Pharmacia) and sulphonyl immobilized on agarose (e.g. S-SEPHAROSE FAST FLOW™ from Pharmacia). Preferred is Fractogel® EMD SO$_3$, Fractogel® EMD SE Highcap, Eshmuno® S and Fractogel® EMD COO (Merck).

A "mixed mode" matrix is a chromatography matrix which carries at least two types of functionalities which can interact with the target molecule and/or impurities. Such functionalities can be ion exchange groups, hydrophobic interaction groups, hydrophilic interaction groups, thiophilic interactions groups, metal affinity groups, affinity groups and bioaffinity groups. Preferred mixed mode matrices to be used in the present invention are matrices carrying at least anion exchange and cation exchange groups or mixed mode ion exchange matrices. "Carry at least two types of functionalities" means in one embodiment that one type of matrix is provided that is covalently modified with at least two types of different functionalities. It is also possible that the mixed mode matrix is made of a combination of two or more different matrices each having at least one functionality, whereby the combination is realized by combining the matrices in one separation unit. In this case the mixed mode matrix can be a mixture of two different matrices, each matrix carrying at least one functionality, e.g. be a mixture of a cation exchange matrix and an anion exchange matrix, for example both present in the form of sorbent particles which can be easily mixed in the separation unit. It is also possible to couple one column filled with a first matrix with another column filled with a second matrix to one separation unit so that the sample liquid is flowing through both matrices.

A "mixed mode ion exchange matrix" refers to a chromatography matrix which is covalently modified with cationic and/or anionic and hydrophobic moieties. A commercially available mixed mode ion exchange resin is BAKERBOND ABX™ (J. T. Baker, Phillipsburg, N.J.) containing weak cation exchange groups, a low concentration of anion exchange groups, and hydrophobic ligands attached to a silica gel solid phase support matrix. Mixed mode cation exchange matrices typically have cation exchange groups and hydrophobic moieties. Suitable mixed mode cation exchange matrices are Capto® MMC (GE Healthcare) and Eshmuno® HCX (Merck). Mixed mode anion exchange matrices typically have anion exchange groups and hydrophobic moieties. Suitable mixed mode anion exchange matrices are Capto® Adhere (GE Healthcare).

The term "anion exchange matrix" is used herein to refer to a chromatography matrix which is positively charged, e.g. having one or more positively charged ligands, such as quaternary amino groups, attached thereto. Commercially available anion exchange resins include DEAE cellulose, QAE SEPHADEX™ and FAST Q SEPHAROSE™ (Pharmacia). Preferred materials are Fractogel® EMD TMAE, Fractogel® EMD TMAE highcap, Eshmuno® Q and Fractogel® EMD DEAE.

The terms "Protein A" and "Prot A" are used interchangeably herein and encompasses Protein A recovered from a native source thereof, Protein A produced synthetically (e.g., by peptide synthesis or by recombinant techniques), and variants thereof which retain the ability to bind proteins which have a $CH_2/CH_3$ region, such as an Fc region. Protein A can be purchased commercially from Repligen, Pharmacia and Fermatech. Protein A is generally immobilized on a chromatography matrix. The term "ProA" also refers to an affinity chromatography matrix or column containing chromatographic solid support matrix to which is covalently attached Protein A.

A functional derivative, fragment or variant of Protein A used in the methods according to the present invention may be characterized by a binding constant of at least $K=10^{-8}$ M, and preferably $K=10^{-9}$ M, for the Fc region of mouse IgG2a or human IgGI. An interaction compliant with such value for the binding constant is termed "high affinity binding" in the present context. Preferably, such functional derivative or variant of Protein A comprises at least part of a functional IgG binding domain of wild-type Protein A, selected from the natural domains E, D, A, B, C or engineered mutants thereof which have retained IgG binding functionality.

Also, Protein A derivatives or variants engineered to allow a single-point attachment may also be used in the affinity chromatography step in the claimed methods.

Single point attachment generally means that the protein moiety is attached via a single covalent bond to a chromatographic support material of the Protein A affinity chromatography. Such single-point attachment may also occur by use of suitably reactive residues which are placed at an exposed amino acid position, namely in a loop, close to the N- or C-terminus or elsewhere on the outer circumference of the protein fold. Suitable reactive groups are e.g. sulfhydryl or amino functions.

The term "affinity chromatography matrix" is used herein to refer to a chromatography matrix which carries ligands suitable for affinity chromatography. Typically the ligands (e.g., Protein A or a functional variant thereof) are covalently attached to a chromatography matrix material and are accessible to the target molecule in solution as the solution contacts the chromatography matrix. One example of an affinity chromatography matrix is a proteinA matrix.

The term "binding" as used herein to describe interactions between a target molecule (e.g., an Fc region containing protein) and a ligand attached to a matrix (e.g., Protein A bound to a solid phase matrix or resin), refers to the generally reversible binding of the target molecule to a ligand through the combined effects of spatial complementarity of e.g. protein and ligand structures at a binding site coupled with electrostatic forces, hydrogen bonding, hydrophobic forces, and/or van der Waals forces at the binding site. Generally, the greater the spatial complementarity and the stronger the other forces at the binding site, the greater will be the binding specificity of a protein for its respective ligand. Non-limiting examples of specific binding includes antibody-antigen binding, enzyme-substrate binding, enzyme-cofactor binding, metal ion chelation, DNA binding protein-DNA binding, regulatory protein-protein interactions, and the like. Ideally, in affinity chromatography specific binding occurs with an affinity of about $10^{-4}$ to $10^{-8}$ M in free solution.

The term "detergent" refers to ionic and nonionic surfactants such as polysorbates (e.g. polysorbates 20 or 80); poloxamers (e.g. poloxamer 188); Triton; sodium dodecyl sulfate (SDS); sodium laurel sulfate; sodium octyl glycoside; lauryl-, myristyl-, linoleyl-, or stearyl-sulfobetaine; lauryl-, myristyl-, linoleyl- or stearyl-sarcosine; linoleyl-, myristyl-, or cetyl-betaine; lauroamidopropyl-, cocamidopropyl-, linoleamidopropyl-, myristamidopropyl-, palmidopropyl-, or isostearamidopropyl-betaine (e.g. lauroamidopropyl); myristamidopropyl-, palmidopropyl-, or isostearamidopropyl-dimethylamine; sodium methyl cocoyl-, or disodium methyl oleyl-taurate; and the MONAQU AT™ series (Mona Industries, Inc., Paterson, N.J.), Useful detergents is a polysorbate, such as polysorbate 20 (TWEEN 20®.) or polysorbate 80 (TWEEN 80®.) or various acids, such as octanoic acid.

A "buffer" is a solution that resists changes in pH by the action of its acid-base conjugate components. Various buffers which can be employed depending, for example, on the desired pH of the buffer are described in Buffers. A Guide for the Preparation and Use of Buffers in Biological Systems, Gueffroy, D., ed. Calbiochem Corporation (1975). Non-limiting examples of buffers include MES, MOPS, MOPSO, Tris, HEPES, phosphate, acetate, citrate, succinate, and ammonium buffers, as well as combinations of these.

According to the present invention the term "buffer" or "solvent" is used for any liquid composition that is used to load, wash, elute and reequilibrate the separation units.

When "loading" a separation column a buffer is used to load the sample or composition comprising the target molecule (e.g., an Fc region containing target protein) and one or more impurities onto a chromatography column (e.g., an affinity column or an ion exchange column). The buffer has a conductivity and/or pH such that the target molecule is bound to the chromatography matrix while ideally all the impurities are not bound and flow through the column.

When "loading" a separation column to "flow through" a target molecule a buffer is used to load the sample or composition comprising the target molecule (e.g., an Fc region containing target protein) and one or more impurities onto a chromatography column (e.g., an affinity column or an ion exchange column). The buffer has a conductivity and/or pH such that the target molecule is not bound to the chromatography matrix and flow through to column while ideally all the impurities are bound the column.

The term "reequilibrating" refers to the use of a buffer to re-equilibrate the chromatography matrix prior to loading the target molecule. Typically, the loading buffer is used for reequilibrating.

By "washing" a chromatography matrix is meant passing an appropriate buffer through or over the matrix. Typically washing is used to remove weakly bound contaminants from the matrix prior to eluting the target molecule.

In this case, typically, the wash buffer and the loading buffer are be the same. In case virus inactivation buffer is used, it is used to inactivate certain present virus prior to eluting the target molecule. In this case, typically, the virus inactivation buffer differs from loading buffer since it may contain detergent/detergents or have different properties (pH/conductivity/salts and their amounts).

To "elute" a molecule (e.g., a polypeptide of interest or an impurity) from a chromatography matrix is meant to remove the molecule therefrom by altering the solution conditions such that buffer competes with the molecule of interest for the ligand sites on the chromatography resin. A non-limiting example is to elute a molecule from an ion exchange resin by altering the ionic strength of the buffer surrounding the ion exchange material such that the buffer competes with the molecule for the charged sites on the ion exchange material.

The term "virus inactivation," or "VI" as used interchangeably herein, refers to any process which may render a virus incapable of infecting a cell or inhibit a virus function through a physico-chemical means. Typical virus inactivation methods include, but are not limited to, low pH treatment (e.g., below pH 4.5, below 4.0 or below 3.8), heat treatment, treatment with surfactants and radiation (e.g., ultraviolet light exposure). In some embodiments, virus inactivation methods are directed against retroviruses.

In a particular embodiment, low pH conditions are used for virus inactivation as such conditions typically disrupt the virus lipid envelope, thereby inactivating the virus.

In particular embodiment, certain surfactants are used for virus inactivation as they typically disrupt the virus, thereby inactivating the virus (like Tween, Triton X-100, SDS).

According to the present invention a "separation unit" is an equipment onto which a chromatographic separation step can be performed. A separation unit typically is a chromatography column or chromatography cartridge which is filled with a sorbent matrix. Chromatography columns are known to a person skilled in the art. They typically comprise a column tube with end-fittings for fluid-inlet and fluid-outlet. The column tube is filled with a suitable chromatography matrix.

According to the present invention a "continuous" process is a process that is not run in the batch mode. In a continuous process according to the invention new sample is loaded onto separation units A1 or A2 not only once but sequentially in an alternating way either on separation unit A1 or on separation unit A2 with only short breaks or preferably no breaks in between.

According to the invention "sequential" is two times or more than two times.

According to the present invention a "connecting line" is any tube, hose, pipe or channel which is suitable for flowing liquids there through. A connecting line can be interrupted by one or more valves. A connecting line might be straight or branched.

According to the present invention if two parts of an apparatus are "in fluid connection" it means that there is a connecting line between the two parts of the apparatus so that liquid can flow from one part to the other. This connecting line can be direct or it can be interrupted by one or more valves, by a separation unit or other parts of the apparatus. The term "in fluid connection" encompasses a fluid connection that is permanent but it also encompasses a fluid connection that is not permanent and is made of a connecting line that is e.g. interrupted by one or more valves so that the flow of liquid through the connecting line can started and stopped whenever necessary. Typically, most of the parts of the apparatus that are in fluid connection have a fluid connection that is not permanent. For example, if a buffer reservoir is in fluid connection with a separation unit this means that a flow of the buffer to the column can be realized if necessary but typically there is at least one valve located in the connecting line between the reservoir and the separation unit so that the liquid flow can be stopped when necessary and started when necessary.

If a flow of liquid is actually realized between two part of the apparatus that are in liquid connection and thus liquid is flowing through the connecting line between the two parts, these two parts are in "fluid communication". Consequently, "fluid communication" according to the present invention describes the status in which a "fluid connection" is actually used by flowing liquid through the connecting line. If two parts of the system are partly in fluid communication it means that the fluid communication is not permanent and the liquid is not permanently flowing from one part to the other but only part of the time. Typically the flow of the liquid between two parts of the system is started and/or stopped with the aid of valves that direct the liquid flow.

A "fluid inlet" or "inlet" is any means that enables the introduction of liquid. A separation unit inlet is for example the end-fitting of a chromatography column to which a connecting line can be connected. An inlet can also be a valve that provides the introduction of liquid in a connecting line. A inlet can also be the end of a connecting line.

An "outlet" or "fluid outlet" is any means that enables the withdraw of a liquid. A separation unit outlet is for example the end-fitting of a chromatography column to which a connecting line can be connected. An outlet can also be a valve that provides the introduction of liquid in a connecting line. A outlet can also be the end of a connecting line.

A "fluid selection valve" is any means that enables a fluid communication selectively between any connected fluid and the system part. A fluid selection valve is for example the valve prior the separation unit inlet, to which the connecting lines can be connected and selectively chosen which can enable the fluid communication between the selected line and the separation unit inlet. A fluid selection valve is for example the valve after the separation unit outlet, to which the connecting lines can be connected and selectively chosen which can enable the fluid communication between the selected line and the separation unit outlet. A fluid selection valve can also be a valve that provides the introduction of liquid in a connecting line. A fluid selection valve can also be the end of a connecting line.

A "solvent selection valve" is a fluid selection valve that enables a fluid communication selectively between any connected solvent reservoir and the system part. A solvent selection valve is for example the valve prior the solvent pump, to which the connecting lines can be connected from the solvent reservoirs and selectively chosen which can enable the fluid communication between the selected solvent and the pump.

A "fluid selection valve" and "solvent selection valve" can be of identical type or of different type.

A solvent delivery system is a system that enable the delivery of liquid. Typically the solvent delivery system of an apparatus comprises at least one reservoir and at least one pump to transport the liquid from the reservoir to another part of the apparatus which is in liquid connection with the reservoir. It is known to a person skilled in the art that every time liquid is transferred from a reservoir to a separation unit this is done with the aid of a pump. The pumps can also be used to mix two or more liquid streams coming from two or more reservoirs.

DETAILED DESCRIPTION OF THE INVENTION

The present invention for the first time provides a method and an apparatus suitable for a continuous chromatography process which only needs three separation columns. The process is a two step procedure comprising two chromatographic steps. If the apparatus has three separation units, the first chromatographic step (capture) is performed alternating and sequentially on two separation units, the second chromatographic step (polishing) is performed, also sequentially, on the third separation unit. The first two separation units having the same chromatography matrix are alternately loaded with the sample. That means while one of the units is loaded with the sample, at the same time, the other unit can be subjected to other process steps like equilibration, washing, elution of the target molecule etc. The third separation unit which has a chromatography matrix that is different from the matrix of the first two units is fed with the target molecule that is eluted from the first two units. As the first two units are loaded sequentially, they are also eluted sequentially. That means while one unit is loaded, the other—already loaded—unit is optionally washed and then the target molecule is eluted from this unit with an elution buffer that preferably allows direct feed to the third unit.

Having performed the second chromatographic separation on the third unit, the purified target molecule can then be recovered from the fluid outlet of the third unit.

The method and apparatus according to the present invention allow high loading of the first dimension separation units resulting in high dynamic binding capacities and faster throughput to shorten residence times.

Furthermore, the method and apparatus according to the present invention enable connecting the first separation dimension (capture) with the second separation dimension (polishing) typically without additional conditioning, since the captured product is preferably eluted from the first dimension in the conditions, that fit the second (polishing) dimension.

The method according to the present invention can be applied to different chromatographic modes, e.g. CIEX capture combined with AIEX polishing, Prot A capture combined with CIEX polishing and AIEX capture combined with CIEX polishing, without changes in the concept and technological solution. Therefore it is not only economical, but also a robust purification technology suitable for the purification of a wide range of target molecules (e.g. biopharmaceutical molecules having pI from 2-14).

In a preferred embodiment, the separation units A1 and A2 have an affinity chromatography matrix and the separation unit B has a cation exchange chromatography matrix.

In another preferred embodiment, the separation units A1 and A2 have an affinity chromatography matrix and the separation unit B has an anion exchange chromatography matrix.

In another preferred embodiment, the separation units A1 and A2 have a cation exchange chromatography matrix and the separation unit B has an anion exchange chromatography matrix.

In another embodiment, the separation units A1 and A2 have an anion exchange chromatography matrix and separation unit B has a cation exchange chromatography matrix.

In another embodiment, the separation units A1 and A2 have an affinity chromatography matrix and separation unit B has a mixed mode chromatography matrix.

In another embodiment, the separation units A1 and A2 have an affinity chromatography matrix and separation unit B has a mixed mode cation and an anion exchange chromatography matrix or a mixed mode anion and a cation exchange chromatography matrix or a mixed mode cation and a mixed mode anion exchange chromatography matrix.

In another embodiment, the separation units A1 and A2 have a cation exchange matrix and a separation unit B has a mixed mode chromatography matrix.

A schematic view of the apparatus according to the invention is shown in FIG. 2. In FIG. 2, the connecting line between the outlets of separation units A1 and A2 and the inlet of separation unit B is named connecting line C-P.

The apparatus according to the invention comprises three separation units, two capture separation units A1 and A2 having the same chromatography matrix and one polishing separation unit B. Beside the separation units it typically comprises at least two pumps, one or more valves, liquid connections, and reservoirs. It may additionally comprise filter units, detection units or other equipment that may be needed or suitable in a chromatographic separation procedure.

The apparatus according to the present invention can be a conventional chromatography system or a single-use system. It comprises columns, valves, reservoirs and other equipment that is typically used in chromatography systems. The separation units might for example be stainless steel columns, plastic columns or glass columns that are filled with the respective chromatography matrices and have suitable end-fittings for solvent inlet and outlet.

In some embodiment the apparatus according to the present invention may comprise more than three separation units, for example it might have 3 or 4 capture separation units having the same chromatography matrix and 2 or 3 polishing separation units having the same chromatography matrix but a chromatography matrix that differs from the matrix of the capture separation units. In exemplary embodiments it may have two capture separation units A1 und A2 in combination with 2 polishing separation units B1 and B2 three capture separation units A1, A2 and A3 in combination with 1 polishing separation unit B three capture separation units A1, A2 and A3 in combination with 2 polishing separation units B1 and B2

In a preferred embodiment the apparatus according to the present invention has five separation units, three capture separation units A1, A2 and A3 having the same chromatography matrix and two polishing separation units B1 and B2.

To ensure that either the fluid outlet of separation unit A1 or the fluid outlet of separation unit A2 or the fluid outlet of separation unit A3 can be in fluid communication with the inlet of separation unit B1 or with the inlet of separation unit B2, at least one valve is located between the fluid outlets of separation units A1, A2 and A3 and the fluid inlet of separation units B1 and B2. Preferably there is a valve located after the outlet of each separation unit A1 and A2 and A3, enabling a fluid communication with the inlet of separation unit B1 or with the inlet of separation unit B2. The apparatus also comprises at least two buffer reservoirs and at least two pumps, also called the solvent delivery system, which provide for the storage and provision of the buffers needed e.g. for the loading, washing and the elution of the target molecules. Typically separation units A1, A2 and A3 have at least one fluid inlet that is connected to at least one buffer reservoir and separation units B1 and B2 have at least one fluid inlet that is connected to at least one buffer reservoir. Typically separation units B1 and B2 have at least one fluid outlet.

In a very preferred embodiment the apparatus according to the present invention has three separation units, two capture separation units A1 and A2 having the same chromatography matrix and one polishing separation unit B.

In the following the description of the apparatus and the method are focused on an apparatus with two capture separation units A1 and A2 having the same chromatography matrix and one polishing separation unit B. This is not meant to be restrictive but to make the description more comprehensive. A person skilled in the art can transfer the description also to systems with more than three units as described above.

To ensure that either the fluid outlet of separation unit A1 or the fluid outlet of separation unit A2 can be in fluid communication with the inlet of separation unit B, at least one valve is located between the fluid outlets of separation units A1 and A2 and the fluid inlet of separation unit B.

The apparatus also comprises at least two buffer reservoirs and at least two pumps, also called the solvent delivery system, which provide for the storage and provision of the buffers needed e.g. for the loading, washing and the elution of the target molecules. Typically for each chromatographic step, one loading buffer and one elution buffer is needed.

In one embodiment of the present invention the apparatus only comprises two buffer reservoirs for binding and elution buffers, one reservoirs for buffer A and one reservoir for buffer B. Buffer A is a loading and thus binding buffer for the first dimension providing conditions under which the target molecule is captured on the separation units A1/A2. In addition, buffer A is an elution buffer for the second dimension providing conditions under which the target molecule is eluted from separation unit B. Buffer B, is a elution buffer for the first dimension (separation unit A1/A2), but a binding buffer for the second dimension (separation unit B).

In other embodiments, the apparatus can comprise additional reservoirs for other buffers, cleaning in place, virus inactivation etc.

Typically the reservoirs and the separation units are connected via connecting lines, valves and pumps. The preferred solvent selection valves for the choice of the solvent prior pump are valves having 6 solvent inlets and 1 solvent outlet which can be connected directly to pump. Any pumps which assure solvent flow could be used including peristaltic pumps, isocratic pumps, gradient pumps, high pressure pumps and the like, low pressure pumps and the like. The preferred fluid selection valves for the choice of the fluid introduction prior a system part inlet are valves having 6 fluid inlets and 1 outlet which can be connected to the system part inlet. The preferred fluid selection valves for the choice of the fluid withdraw after the system part outlet are valves having 6 fluid outlets and 1 inlet which can be connected to the system part outlet.

In one preferred embodiment, the apparatus additionally comprises connecting lines between the two capture separation units A1 and A2 that enable liquid connection between the outlet of column A1 and the inlet of column A2 and vice versa. A schematic view of this embodiment is shown in FIG. 3, where the additional connecting lines are named connecting line F-F. This setup enables a capture of the leached product from the first capture separation unit (at the end of loading) on the second separation unit (just reequilibrated and ready for capture). This enables to use higher throughputs and binding capacities without the loss of target molecule.

In a preferred embodiment, a solvent delivery system is connected to the connecting lines between the two capture separation units A1 and A2, preferably sample solvent delivery system in order to assure a continuous sample feed to any selected capture separation unit.

In another preferred embodiment, the apparatus further comprises one or more detectors. The detectors can be used for control of sample transfer between the columns, for the analysis of sample quality, monitoring etc. The detectors can be located wherever suitable, typically they are located prior to the fluid inlet and/or after the fluid outlet of the separation columns. Examples of suitable detectors are pH detectors, UV detectors, infrared detectors or detectors measuring conductivity.

Preferably, detectors are located prior to the fluid inlet and after the fluid outlet of all separation columns. This set up ensures the control of the sample transfer between the separation units.

In another preferred embodiment the apparatus further comprises a computer system. The detectors as well as the pumps and valves are connected to the computer system. This computer system enables control of the pumps and valves and detectors. Preferably, the computer system comprises a software and algorithms that allow the apparatus to be used in a partly or fully automated mode.

In another preferred embodiment, an additional fluid inlet, that means preferably a connecting line to one or more reservoirs is located prior to the fluid inlet of separation unit B. In FIGS. 2, 3 and 4 this additional inlet is named Inlet C. Typically the additional fluid inlet is located after the outlet of the separation unit A1 and A2 and prior to the fluid inlet of separation unit B. Preferably, it is located after the valve that is located in the connecting line between the outlets of separation unit A1 and A2 and the fluid inlet of separation unit B and prior to the fluid inlet of separation unit B. This ensures that column B cannot only be fed with the eluates from separation units A1 and A2 but also with additional buffers or reagents, e.g. for inline dilution, elution, equilibration, cleaning in place, virus inactivation etc.

In another preferred embodiment, the apparatus further comprises an additional reservoir for cleaning in place. Cleaning in place (CIP) is a technology known to the person skilled in the art. Cleaning in place is the removal of very tightly bound, precipitated or denatured substances from the chromatography matrix. If such contaminants are not removed from the chromatography matrix they might affect the chromatographic properties of the column, decreasing binding capacity and come off in subsequent runs which results in carryover of contaminants or product between cycles. A standard CIP protocols typically includes one to five washes with one to three column volumes of aqueous buffers comprising ingredients like 6 M guanidine hydrochloride
10 mM to 500 mM NaOH
10 mM to 500 mM NaOH and 1 M NaCl,
50 mM NaOH and 1 M $Na_2SO_4$,
   150 mM phosphoric acid solution,
   6M urea,
   20% ethanol,
   20% ethanol and 0.5M acetic acid,
   20% ethanol and 2M acetic acid,
   1% Tween or Triton® surfactant X-100 or the like.

Concentration of the ingredients like NaOH, the contact time of the CIP buffer on the column as well as the frequency of performing the CIP can be adjusted and determined by the person skilled in the art.

The apparatus according to the present invention preferably has at least one reservoir containing a CIP buffer. The CIP buffer can be used for the CIP of all separation units if suitable. Then the buffer reservoir is in liquid connection with all separation units in a way that the flow of the CIP buffer can be directed to each of the columns independently. In another embodiment, the apparatus comprises two reservoirs with two different CIP buffers. One reservoir is in fluid connection to the separation units A1 and A2, whereby the flow to separation unit A1 and separation unit A2 can be realized independently, the other reservoir is in fluid connection with separation unit B. Cleaning in place washes can be performed after each separation cycle. Typically CIP is done after every second, third, fourth, fifth, sixth, seventh, eighth, ninth or tenth separation cycle depending on the sample and thus the amount and type of contaminants that might contaminate the separation unit. A person skilled in the art is aware of the fact that CIP can be left out or can be dramatically simplified for single use systems.

In another preferred embodiment, the apparatus comprises an additional reservoir for virus inactivation (VI).

Impurity purification, especially virus deactivation and removal are playing the major role in the biopharmaceutical compound production as virus levels in biopharmaceutical compounds are regulated by the FDA. It is possible to perform virus inactivation in an additional purification step, where, depending on the biopharmaceutical compound, virus inactivation can be done e.g. by solvent/detergent inactivation, pasteurization, acidic pH inactivation or UV inactivation.

It has been found that when using the apparatus according to the present invention and the procedure according to the present invention, it is possible to also include virus inactivation in the purification process. For this, either the separation units A1 and A2 or separation unit B or all separation units are in fluid connection with an additional reservoir which contains a virus inactivation buffer. The virus inactivation buffer is then flowed through the separation unit on which the virus inactivation shall take place while the target molecule is bound on the matrix of said separation unit. Preferably the separation units are connected with the reservoir for either low pH or detergent virus inactivation or both, preferably the virus inactivation step is done on cation exchange matrixes. If the virus inactivation is performed on capture units A1 and A2, the reservoir containing the virus inactivation buffer is in fluid connection with the separation units A1 and A2 in a way that the flow to separation unit A1 and separation unit A2 can be realized independently. If the virus inactivation is performed on a polishing unit B, the reservoir containing the virus inactivation buffer is in fluid connection with the separation unit B. Suitable buffers for integrated low pH virus inactivation are buffers with an acidic pH, preferably buffers with a pH between 3 and 4. Examples of suitable buffers are acetate, glycine and others. Suitable buffers for integrated surfactant virus inactivation are buffers with at least one surfactant or detergent. Examples of suitable detergents are octanoic acid, Tween or Triton surfactant X-100. To perform the virus inactivation step while the target molecule is "on column", that means while it is bound on the matrix of a separation unit, leads to a reduction of the overall number of purification steps as virus inactivation in pool which is typically performed in addition to the chromatography steps is avoided.

In a preferred embodiment, the apparatus does not contain any reservoir for pooling. In known chromatographic separation procedures often all fractions that are eluted from a first column and that contain the target molecule are first pooled before they are loaded on a second chromatography column. It has been found that the method and apparatus of the present invention provide a set up in which such pooling is not necessary. Preferably, when, after loading and washing, the target molecule is eluted from the separation units A1 or A2, all eluent containing the target molecule is directly, without pooling directed to the inlet of separation unit B and loaded on separation unit B.

This additionally speeds up the purification process. For this, the separation units A1 and A2 are in fluid connection with separation unit B without any reservoir interrupting this connection. This is especially preferred if the apparatus only comprises two buffer reservoirs for binding and elution as described above. If the separation mode necessitates the use of more than two buffers, a pooling can also be avoided by introducing an additional fluid inlet prior to the fluid inlet of separation unit B (as described above) which can be used for inline dilution and buffer exchange.

In one embodiment, the apparatus comprises two separation units with an affinity chromatography matrix and one separation unit with an ion exchange, preferably a cation exchange matrix. Suitable affinity matrices are matrices having Protein A, Protein G, Protein L or Protein r functional groups (e.g. Prosep® Highcap (Merck Millipore), Prosep® Ultra Plus (Merck Millipore), Poros® Prot A (Life Technologies), A650F (Tosoh), MabSelect® Sure (GE). Suitable cation exchange matrices are matrices having but not limited to strong cation exchange groups, such as sulphopropyl, sulfonic acid (Fractogel EMD® SO$_3$, Fractogel EMD® SE highcap (Merck) Eshmuno® S (Merck) SP-SEPHAROSE FAST FLOW™ or SP-SEPHAROSE HIGH PERFORMANCE™, from Pharmacia, or but not limited to weak cation exchange groups, such as carboxylic acid like Fractogel® EMD Carboxy (Merck).

In another embodiment, the apparatus comprises two separation units with a cation exchange matrix and one separation unit with an anion exchange, matrix.

Suitable cation exchange matrices are matrices having but not limited to strong cation exchange groups, such as sulphopropyl, sulfonic acid or having but not limited to weak cation exchange groups, such as carboxylic acid are the ones mentioned above.

Suitable anion exchange matrices are matrices having but not limited to one or more positively charged ligands, such as quaternary amino groups. Commercially available anion exchange resins include DEAE cellulose, QAE SEPHADEX™ and FAST Q SEPHAROSE™ (Pharmacia), Fractogel® TMAE (M), Fractogel® TMAE HC (M) or Eshmuno® Q (Merck).

In another embodiment, the apparatus comprises two separation units with an anion exchange matrix and one separation unit with a cation exchange, matrix. Suitable cation exchange matrices and anion exchange matrices have been listed above.

In all embodiments, also mixed mode matrices can be used instead of ion exchange matrices as well as combinations thereof. An example is a combination of anion exchange and a hydrophobic functionality (Capto Adhere (GE Healthcare) or a combination of cation exchange and a hydrophobic functionality such as (Capto™ MMC (GE Healthcare), Eshmuno® HCX (Merck KGaA), POROS® XS (Applied Biosystems).

FIG. 1 shows a preferred embodiment of the apparatus according to the present invention. Column A1 and A2 are called "CIEX", showing that these two columns have the same chromatography matrix, e.g. a cation exchange resin. Column B is called AIEX, suggesting that this column might have an anion exchange chromatography matrix. Conductivity detectors ("Cond.") are located prior to the fluid inlet of all three columns. UV and pH detectors ("UV, pH") are located at the fluid outlets of all three columns. Columns A1 and A2 are connected with 6 reservoirs for cleaning in place ("CIP"), virus inactivation ("VI"), loading buffer ("E.A"), elution buffer ("E.B"), a dilution buffer ("Dil.") and the sample feed ("Feed"). Column B is connected to three reservoirs for cleaning in place ("CIP"), loading buffer ("E.A"), elution buffer ("E.B"). Preferably the elution buffer used for columns A1/A2 is the same as the loading buffer used for column B and vice versa. The reservoirs and the columns are connected via connecting lines. Preferably all connecting lines are at least once interrupted by a valve to be able to control the liquid flow. Liquid transport is realized with the aid of pumps.

The invention further provides a method for continuous purification of a target molecule from a sample comprising the target molecule and one or more impurities. The method of the invention is performed on the respective inventive apparatus. A schematic view of a suitable apparatus is shown in FIGS. 2, 3 and 4. The method comprises sequentially repeating steps. The separation units A1 and A2 for the first chromatographic dimension are continuously, sequentially loaded with the sample so that while the sample is loaded onto separation unit A1, separation unit A2 is at least partly in fluid communication with separation unit B so that the target molecule is eluted onto separation unit B and separation unit A2 is reequilibrated and while the sample is loaded on separation unit A2, separation unit A1 is at least partly in fluid communication with separation unit B so that the target molecule is eluted onto separation unit B and separation unit A1 is reequilibrated.

In addition, a second chromatography step takes place on separation unit B leading to the recovery of the purified target molecule from the fluid outlet of separation unit B.

To ensure that the method of the present invention works in continuous mode, the speed of the two chromatographic separation steps needs to be adjusted. Typically, loading, chromatographic separation and reequilibration on separation unit B in the second chromatographic step are faster than loading, chromatographic separation and reequilibration on separation units A1 and A2 so that separation unit B is ready for new loading each time the target molecule is eluted either from separation unit A1 or separation unit A2.

Otherwise the elution of the target molecules from separation units A1 or A2 is delayed until separation unit B is ready for loading or a second separation unit B2 might be integrated into the system.

When performing the method according to the present invention eluting the target molecule from separation units A1/A2 to separation unit B means that the whole fraction containing the target molecule can be loaded on separation unit B or only parts of the fraction. To reduce the amount of impurities it can be advisable to load only those parts of the fraction containing the target molecule on separation unit B which contain very little impurities. It is also possible to take away a part of the target molecule fraction for in process control to analyze the purity and other properties of the target molecule after the first separation step.

In the following exemplary embodiments are further described. The labelling of the components of the apparatus refers to the labelling used in FIG. 2.

A) embodiments in which in both chromatography steps (capture and polishing) the target molecule is bound to the matrix of the respective separation unit (bind-bind mode):

In one embodiment, the method according to the invention is performed by a) feeding the sample onto a separation column A1 (e.g. cation exchange material) through inlet A (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material) is connected with inlet B (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) feeding the sample onto a separation unit A2 (e.g. cation exchange material) through inlet A (e.g. solvent delivery system) wherein the sample is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

For the continuous mode preferably, the steps a) and b) are repeated at least twice.

In a preferred embodiment while feeding the sample onto separation unit A2 (e.g. cation exchange material) through inlet B (e.g. solvent delivery system) wherein the sample is at a first pH and conductivity enabling target molecule (e.g. antibody) to be bound to separation unit A2, to reach especially high amounts of bound target molecule without reasonable losses, at the end of the loading, that means when the loading is almost finished, the outlet of separation unit A2 is connected with the inlet of separation unit A1 through a connecting line F-F to enable the capture of the starting to leach target molecule from the separation unit A2 to be bound to separation unit A1. As soon as too much leach of the target molecule form separation unit A2 is detected, the sample feed is switched from separation unit A2 to separation unit A1. Meanwhile the target molecule on A1 is washed and eluted onto separation unit B. After reequlibration of separation unit A1 its inlet is connected to the outlet of separation column A2 to ensure that the starting to leach target molecule from the separation unit A1 is bound to separation unit A2.

This specific intermediate connection of the two separation unit A1 and A2 provides the unique possibility to safe time by loading separation units A1 and A2 with very high amounts of target molecule. In known chromatography systems, typically, the columns are loaded until about 60 to 80% dynamic binding capacity. The apparatus and method according to the present invention with the specific intermediate connection of the two separation unit A1 and A2 offer the possibility to load the separation units A1 and A2 until more than 80% dynamic binding capacity, preferably until 80 to 95% dynamic binding capacity without loss of target molecule. The dynamic binding capacity of a chromatography media is the amount of target molecule the media will bind under actual flow conditions before significant breakthrough of unbound protein occurs.

If the sample is loaded on separation unit A1 and especially when the loading is nearly finished and the target molecule starts to leach out of the separation unit, the outlet of separation unit A1 can be connected to the inlet of separation unit A2 so that the target molecule that would otherwise have to be collected and put in the sample feed again is directly fed on separation unit A2. A person skilled in the art is able to determine when it is the best point to stop sample feed to separation unit A1 and switch the sample feed to separation unit A2. At the same time also the connection of the outlet of separation unit A1 to the inlet of separation unit A2 is interrupted and while separation unit A2 is further loaded with the sample feed, separation unit A1 is washed and then connected with the inlet of separation unit B to elute the target molecule onto separation unit B. After reequilibration of separation unit A1 it is again connected to the outlet of separation unit A2 to capture target molecule that might leach from column A2 at the end of the sample loading.

A schematic view of an apparatus suitable for this embodiment is shown in FIG. 3. Using an apparatus according to the schematic view shown in FIG. 3, the method of the invention can for example be performed as follows:

a) feeding the sample onto a separation column A1 (e.g. cation exchange material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) feeding the sample onto a separation unit A2 (e.g. cation exchange material) through inlet B (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing of the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

d) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

For the continuous mode preferably, the steps a) to d) are repeated at least twice.

It has been found that losses of target molecule which often result from eluting unbound target molecule during washing can be reduced by the following way of performing the method according to the invention:

In a preferred embodiment after the separation unit A2 (or A1 respectively) has been loaded to high amounts of bound target molecule through inlet B (e.g. solvent delivery system), during washing the unbound target molecule is washed to separation unit A1 to transfer the not bound target molecule without reasonable losses. That means when the loading is finished, the outlet of separation unit A2 is connected with the inlet of separation unit A1, e.g. through a connecting line W-F, to enable the capture of the washed target molecule from the separation unit A2 to be bound to separation unit A1 (see FIG. 4). As soon as too little of the target molecule from separation unit A2 is detected, fluid communication is interrupted and the column A2 outlet is switched to outlet position A2-W to withdraw the unbound molecules. Meanwhile the target molecule is further loaded on separation unit A1, as the target molecule on separation unit A2 is further washed and eluted onto separation unit B. After reequilibration of separation unit A2 its inlet is connected to the outlet of separation column A1 to ensure that the starting to leach target molecule from the separation unit A1 is bound to separation unit A2.

This specific intermediate connection of the two separation units A1 and A2 provides the unique possibility to safe time and avoid target molecule losses by washing them. In known chromatography systems, typically, the column wash fraction is withdrawn to waste or collected back to the feed reservoir. The apparatus and method according to the present invention offer the possibility to wash the separation units A1 and A2 with low target molecule losses, preferably until 2 to 3% of total target molecule losses by using this preferred purification process.

A schematic view of an apparatus suitable for this embodiment is shown in FIG. 4. Using an apparatus according to the schematic view shown in FIG. 4, the method of the invention can for example be performed as follows:

a) feeding the sample onto a separation column A1 (e.g. cation exchange material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. cation exchange material) through inlet B (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

For the continuous mode preferably, the steps a) to f) are repeated at least twice.

B) embodiments in which in the first chromatography step (capture) the target molecule is bound to the matrix of the respective separation unit and in the second chromatographic step (polishing) the target molecule is weakly bound or not bound to the matrix while impurities are bound (bind-flow through mode):

In one embodiment, the separation columns A1 and A2 for the first chromatographic dimension are continuously, sequentially loaded with the sample so that while the sample is loaded onto separation column A1, separation column A2 is at least partly in fluid connection with column B so that the target molecule is eluted onto separation column B and column A2 is reequilibrated and while the sample is loaded on separation column A2, separation column A1 is at least partly in fluid connection with column B so that the target molecule is eluted onto separation column B and column A1 is reequilibrated.

In addition, a second chromatography step in the flow through mode takes place on separation column B leading to the recovery of the purified target molecule from the fluid outlet of separation column B.

To ensure that the method of the present invention works in continuous mode, the elution conditions of the bind- and elute chromatographic separation step need to be adjusted to the loading conditions for the flow-through step performed on column B. If it is not possible to elute the target molecule from separation units A1 and A2 under conditions that are suitable for loading on separation unit B, typically, to adjust to weak binding conditions or non-binding conditions of the target molecule on the column B, an inlet C might be used. In order to obtain optimum and constant weak binding or non-binding performance, constant solution properties, such as pH and conductivity, are necessary. This is done while conditioning the target molecule eluting from separation units A1 or A2 via Inlet C e.g. by inline dilution or buffer exchange.

Sometimes the biopharmaceutical product purification involves separation of the target molecule from very like ones impurities and sensitive separation methods are required, such as weak ion exchange chromatography. With the method of the present invention, one can do an affinity separation in the bind elute mode, and anion exchange chromatography in weak binding or non-binding conditions (flow through) for the target protein. This was shown to be a very powerful tool. Especially the combination of several matrixes for this flow.through polishing enables to reach required product purity via adsorbing impurities by several different functionalities, such as cation exchange or anion exchange or hydrophobic functionalities and mixtures thereof.

For the flow-through chromatography step it is also possible to use very weak ion exchange matrices or weak mixed mode matrices like activated carbon. Further details about carbonaceous materials, activated carbon and their use in flow-through purification processes can be found in U.S. provisional Patent Application No. 61/575,349, which is hereby incorporated by reference. In the following exemplary embodiments are further described. The labelling of the components of the apparatus refers to the labelling used in FIG. 2

In one embodiment, the method according to the invention is performed by a) feeding the sample onto a separation column A1 (e.g. cation exchange material or affinity material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material or affinity material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media or a mixed mode media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be weakly bound or unbound to separation unit B followed by separation unit B reequilibration with buffer B. The reequilibration steps are done while connecting the separation unit B with Outlet B-W and feeding steps are done while connecting the separation unit B with Outlet B-P to withdraw the purified target molecule (e.g. antibody).

b) feeding the sample onto a separation unit A2 (e.g. cation exchange material or affinity material) through inlet B (e.g. solvent delivery system) wherein the composition is at a first pH and conductivity enabling target molecule (e.g. antibody) to be bound to separation unit A2 (e.g. cation exchange media or affinity material) and not bound molecules to be withdrawn through outlet A2-W, while the separation unit A1 (e.g. cation exchange material or affinity material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media or mixed mode media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be weakly bound or unbound to separation unit B, following by the reequilibration of separation unit B with buffer B. The reequilibration steps are done while connecting the separation unit B with Outlet B-W and feeding steps are done while connecting the separation unit B with Outlet B-P to withdraw the purified target molecule (e.g. antibody).

For the continuous mode preferably, the steps a) and b) are repeated at least twice.

In a preferred embodiment while feeding the composition onto separation unit A2 (e.g. cation exchange material or affinity material) through inlet B (e.g. solvent delivery system) wherein the composition is at a first pH and conductivity enabling target molecule (e.g. antibody) to be bound to separation unit A2, to reach especially high amounts of bound target molecule without reasonable losses, at the end of the loading, that means when the loading is almost finished, the outlet of separation unit A2 is connected with the inlet of separation unit A1 through a connecting line F-F to enable the capture of the starting to leach target molecule from the separation unit A2 to be bound to separation unit A1 (see FIG. 3). As soon as too much leach of the target molecule form separation unit A2 is detected, the sample feed is switched from separation unit A2 to separation unit A1. Meanwhile the target molecule on A1 is washed and eluted onto separation unit B. After reequilibration of separation unit A1 its inlet is connected to the outlet of separation column A2 to ensure that the starting to leach target molecule from the separation unit A1 is bound to separation unit A2.

This specific intermediate connection of the two separation unit A1 and A2 provides the unique possibility to safe time by loading separation units A1 and A2 with very high amount of target molecule. In known chromatography systems, typically, the columns are loaded until about 60 to 80% dynamic binding capacity. The apparatus and method according to the present invention offer the possibility to load the separation units A1 and A2 until more than 80% dynamic binding capacity, preferably until 80 to 95% dynamic binding capacity.

A schematic view of an apparatus suitable for this embodiment is shown in FIG. 3. Using an apparatus according to the schematic view shown in FIG. 3, the method of the invention can for example be performed as follows:

a) feeding the sample onto a separation column A1 (e.g. cation exchange material or affinity material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material or affinity material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media or mixed mode media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be weakly bound or unbound to separation unit B, followed by the reequilibration of separation unit B with buffer B. The reequilibration steps are done while connecting the separation unit B with Outlet B-W and feeding steps are done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) feeding the sample onto a separation unit A2 (e.g. cation exchange material or affinity material) through inlet B (e.g. solvent delivery system) wherein the composition is at a first pH and conductivity enabling target molecule (e.g. antibody) to be bound to separation unit A2 (e.g. cation exchange media or affinity material) and not bound molecules to be withdrawn through outlet A2-W, while the separation unit A1 (e.g. cation exchange material or affinity material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media or mixed mode media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be weakly bound or unbound to separation unit B, followed by the reequilibration of separation unit B with buffer B. The reequilibration steps are done while connecting the separation unit B with Outlet B-W and feeding steps are done while connecting the separation unit B with Outlet B-P to withdraw the purified target molecule (e.g. antibody).

d) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

For the continuous mode preferably, the steps a) to d) are repeated at least twice.

In a preferred embodiment when the separation unit A2 (e.g. cation exchange material or affinity material) is loaded to the especially high amounts of bound target molecule without reasonable losses through inlet B (e.g. solvent delivery system) wherein the composition was at a first pH and conductivity enabling target molecule (e.g. antibody) to be bound to separation unit A2, the unbound target molecule is washed to separation unit A1 to transfer the not bound target molecule without reasonable losses. That means when the loading is finished, the outlet of separation unit A2 is connected with the inlet of separation unit A1 through a connecting line W-F to enable the capture of the washed target molecule from the separation unit A2 to be bound to separation unit A1 (see FIG. 4). As soon as too little of the target molecule from separation unit A2 is detected, connection is interrupted and the column A2 outlet is switched to outlet position A2-W to withdraw the unbound molecules. Meanwhile the target molecule is further loaded on separation unit A1, as the target molecule on separation unit A2 is further washed and eluted onto separation unit B. After reequilibration of separation unit A2 its inlet is connected to the outlet of separation column A1 to ensure that the starting to leach target molecule from the separation unit A1 is bound to separation unit A2.

This specific intermediate connection of the two separation units A1 and A2 provides the unique possibility to safe time and avoid target molecule losses by washing them. In known chromatography systems, typically, the column wash fraction is withdrawn to waste or collected back to the feed reservoir. The apparatus and method according to the present invention offer the possibility to wash the separation units A1 and A2 with low target molecule losses, preferably until 2 to 3% of total target molecule losses in preferred purification process.

A schematic view of an apparatus suitable for this embodiment is shown in FIG. 4. Using an apparatus according to the schematic view shown in FIG. 4, the method of the invention can for example be performed as follows:

a) feeding the sample onto a separation column A1 (e.g. cation exchange material or affinity material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material or affinity material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be weakly bound or unbound to separation unit B, the reequilibration of separation unit B with buffer B. The reequilibration steps are done while connecting the separation unit B with Outlet B-W and feeding steps are done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. cation exchange material) through inlet B (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be weakly bound or unbound to separation unit B, followed by the reequilibration of separation unit B with buffer B. The reequilibration steps are done while connecting the separation unit B with Outlet B-W and feeding steps are done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

For the continuous mode preferably, the steps a) to f) are repeated at least twice.

It has been found that in the method of the present invention, preferably buffers are used which provide for pH dependent binding and elution. It has been found that especially the elution of the target molecules from separation units A1 and A2 is more efficient and faster when using an elution buffer with a pH that differs from the pH of the loading buffer. In other words, the elution profile is more favourable when using an elution buffer with a pH that differs from the pH of the loading buffer. Elution by a pH gradient is especially preferred. Suitable buffers for pH dependent binding and elution are known to a person skilled in the art. Examples of suitable buffer combinations are PBS-glycine, acetate-TRIS and etc In a preferred embodiment the method of the invention comprises the use of only two loading and elution buffers, Buffer A and Buffer B, so that Buffer A is a loading buffer for the first dimension providing conditions under which the target molecule is captured on the separation column A1/A2. In addition, buffer A is an elution buffer for the second dimension providing conditions under which the target molecule is eluted from separation column B. Buffer B, is a elution buffer for the first dimension (column A1/A2), but a capture buffer for the second dimension (column B).

If separation units A1 and A2 have an affinity chromatography matrix like a Prot A matrix, the binding buffer (Buffer A)) typically has a pH between 6 and 8 and a salt concentration (typical salts are phosphate, acetate, chloride, etc.) between 10 mM and 2 M. Preferred are binding buffers with a pH between 6.8 and 7.3 and a salt concentration between 50 mM and 1M. The elution buffer typically has a pH between 2 and 5 and a salt concentration (typical salts are glycine, acetate, etc) between 20 mM and 200 mM. Preferred are elution buffers with a pH between 2.5 and 4.5 and a salt concentration between 20 mM and 50 mM. If for example the elution buffer has a pH of 4 this buffer which is suitable for eluting the target molecule from the Prot A matrix of separation unit A1 and A2 is also suitable for loading the target molecules on a separation unit B with a cation exchange matrix.

If separation units A1 and A2 have a cation exchange matrix, the binding the binding buffer typically has a pH between 4 and 7 and a salt concentration (typical salts are phosphate, acetate, NaCl, etc.) between 10 mM and 300 mM. Preferred are binding buffers with a pH between 4.5 and 6 and a salt concentration between 20 mM and 100 mM. The elution buffer typically has a pH between 7 and 10 and a salt concentration (typical salts are TRIS, PBS, NaCl) between 10 mM and 300 mM. Preferred are elution buffers with a pH between 8 and 9 and a salt concentration between 10 mM and 150 mM. If for example the elution buffer has a pH of 8.5 this buffer which is suitable for eluting the target molecule from the cation exchange matrix of separation unit A1 and A2 is also suitable for loading the target molecules on a separation unit B with an anion exchange matrix.

If separation units A1 and A2 have an anion exchange matrix, the binding buffer typically has a pH between 7 and 10 and a salt concentration (typical salts are TRIS, PBS, NaCl) between 10 mM and 300 mM. Preferred are binding buffers with a pH between 7.5 and 9.5 and a salt concentration between 10 mM and 300 mM. The elution buffer typically has a pH between 4 and 7 and a salt concentration (typical salts are PBS, acetate, NaCl, etc.) between 10 mM and 100 mM. Preferred are elution buffers with a pH between 4.5 and 6.5 and a salt concentration between 10 mM and 100 mM. If for example the elution buffer has a pH of 5.5 this buffer which is suitable for eluting the target molecule from the anion exchange matrix of separation unit A1 and A2 is also suitable for loading the target molecules on a separation unit B with a cation exchange matrix.

In a preferred embodiment, the sample that is subjected to the method of the present invention is a clarified sample. That means the sample is subjected to a clarification step prior to loading it onto separation units A1 or A2.

The clarification step is intended to separate one or more soluble and/or insoluble impurities from the target molecule. For example insoluble impurities like cells and cellular debris are removed from the sample resulting in a clarified fluid containing the target molecule in solution as well as other soluble impurities. A clarification step may involve one or more of the following, either alone or in any combination, centrifugation, settling and/or filtration, preferably tangential flow filtration or depth filtration. Preferably the clarification step does not involve centrifugation but only filtration and/or settling. In a preferred embodiment, filtration is depth filtration.

In some embodiments, depth filters are used to remove one or more insoluble impurities. Depth filters are filters that use a porous filtration medium to retain particles throughout the medium, rather that just on the surface of the medium. A common class of such depth filters are those that comprise a random matrix of fibers bonded (or otherwise fixed), to form a complex, tortuous maze of flow channels. Particle separation in these filters generally results from entrapment by or adsorption to, the fiber matrix. The most frequently used depth filter media for bioprocessing of cell culture broths and other feedstocks usually consists of cellulose fibers, a filter aid such as DE (diatomaceous earth), and a positively charged resin binder.

It has been found that especially good results in the primary removal of particulate impurities can be achieved if the porous depth filter is anisotropic. In some embodiments, the pores have a nominal pore size rating>about 25 µm. In some embodiments, the depth filter comprises at least 2 graded layers of non-woven fibers, wherein the graded layers have a total thickness of about 0.3 cm to about 3 cm.

In some embodiments, depth filters comprise a composite of graded layers of non-woven fibers, cellulose, and diatomaceous earth. The non-woven fibers comprise polypropylene, polyethylene, polyester, nylon or mixtures thereof.

Exemplary depth filters may be found in U.S. Provisional Patent Application No. 61/571,994, incorporated by reference herein.

In some embodiments, a centrifugation and/or tangential flow filtration step may be performed prior to a depth filtration step. Alternatively, a depth filtration step may be performed without the need for a centrifugation and/or a tangential flow filtration step.

In one embodiment, prior to clarification by centrifugation and/or filtration and/or settling, the sample is pretreated with a precipitation composition to precipitate and remove unwanted contaminants from the sample. The precipitation composition at least comprises a precipitant that is able to precipitate contaminants like HCP's, DNA, hormones, etc. from the sample. Precipitants cause the precipitation of a compound from an aqueous and/or soluble state to a non-aqueous and/or insoluble state or aggregate and agglutinate fine particles from a solution, resulting in their settling from the liquid phase and a reduction in solution turbidity.

Examples of suitable precipitants are organic acids (e.g. octanoic acid), inorganic acids (e.g. HCl), other acidic agents that substantially lower the pH towards acidic, salts (e.g., sodium benzoate, sodium chalate, sodium deoxychalate, etc.) other monovalent salts or organic acids which precipitates in the acidic medium). Another example of a precipitant is a short-chain fatty acid such as caprylic acid. In mildly acidic conditions, the addition of short-chain fatty acids such as caprylic acid typically precipitates non IgG proteins while IgG is not precipitated.

Other suitable precipitants are polyelectrolyte polymers (see, e.g., International PCT Patent Application No. WO2008/091740, incorporated by reference herein).

In a preferred embodiment, stimulus responsive polymers are used for precipitating one or more impurities. Examples of such stimulus responsive polymers can be found, e.g., in U.S. Publication Nos., 20080255027, 20090036651, 20090232737 and 20110020327, incorporated by reference herein. Stimulus responsive polymers are generally soluble in an aqueous based solvent under a certain set of process conditions such as pH, temperature and/or salt concentration and are rendered insoluble upon a change in one or more of such conditions and subsequently precipitate out. Exemplary stimulus responsive polymers include, but are not limited to, polyallylamine, polyallylamine modified with a benzyl group or polyvinylamine and polyvinylamine modified with a benzyl group, where the stimulus is phosphate or citrate.

The precipitation composition may further comprise a detergent (Triton X-100, triton X-114, NP-40, Tween-20, OTD, SDS, CHAPS, and/or polyethyleneglycole (PEG) (PEG-1000, PEG 10000) and/or polyvinyl alcohol and/or polyelectrolytes.

The precipitated contaminants are then removed from the sample by clarification prior to loading the sample onto the separation units.

In a preferred embodiment, precipitation is followed by depth filtration, without a centrifugation step to provide the clarified sample.

In a preferred embodiment the clarification of the sample is performed concurrently with the chromatographic purification according to the method of the present invention for at least a part of its duration. In other words, the liquid sample containing the target molecule is not stored in a pool tank after clarification to wait for the whole sample volume to be clarified but as soon as clarified sample is resulting from the clarification process it is continuously used as sample solution for the method of the present invention and loaded on separation unit A1 or A2.

Consequently, the method of the present invention also when using a clarified sample solution does not require the use of pool tanks which are able to store the whole volume of the sample solution. Preferably no pool tanks are used or only pool tanks that can store less than 25% preferably less than 10% of the total volume of the sample solution.

In some embodiments, one or more additional flow through purification steps might be performed after performing the second chromatographic step on separation unit B. For this, the outlet of separation unit B is in fluid connection with one or more additional separations units. One or more valves might be located between the outlet of separation unit B and the inlet of the first additional separation unit and/or in the connecting lines between the optionally following additional separation units (typically connected in series) to ensure the possibility of inline dilution and/or buffer exchange.

The matrices of the additional flow through devices are typically selected from
  activated carbon
  cation exchange
  mixed mode
  size exclusion
  anion exchange The purified target molecule resulting from the method according to the present invention can be further subjected to additional process steps like formulation/sterilization/concentration steps, where the target molecule containing solution is sterilized and formulated to be in a desired buffer at a desired concentration.

In the following are listed further embodiments of the method according to the present invention:

In an exemplary procedure comprising CIEX capture and AIEX polishing, the method according to the invention is performed by a) feeding the sample onto a separation unit A1 (e.g. cation exchange material) through inlet A (e.g. solvent delivery system) wherein the sample is at a first pH and conductivity enabling target molecule (e.g. antibody) to be bound to separation unit A1 (e.g. cation exchange media) and not bound molecules to be withdrawn through outlet A1-W, while the separation unit A2 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A1 with buffer A steps, where the named washing, reequilibration steps are done while connecting the separation unit A2 with outlet A2-W and the named elution step is done while connecting the separation unit A2 with separation unit B (e.g. anion exchange media) directly to transfer the target molecule to separation unit B, while a separation unit B is connected with inlet C (e.g. solvent delivery system) for the feeding of target molecule from the separation unit A2 at the conditions that enable the target molecule to be bound to separation unit B, washing with buffer B, elution of the target molecule with buffer A and reequilibration with buffer B steps where feeding, washing and reequilibration steps are done while connecting the separation unit B with Outlet B-W and elution step is done while connecting the separation unit B with Outlet B-P to withdraw the purified target molecule (e.g. antibody).

b) feeding the sample onto a separation unit A1 (e.g. cation exchange material) through inlet A (e.g. solvent delivery system) wherein the composition is at a first pH and conductivity enabling target molecule (e.g. antibody) to be bound to separation unit A1 to high bound target molecule amounts without reasonable losses while directly connecting the separation unit A1 with separation unit A2 to enable the capture of the starting to leach target molecule from the separation unit A1 to be bound to separation unit A2 where separation unit A2 is connected with outlet A2-W to withdraw the unbound molecules, while a separation unit B is connected with inlet C (e.g. solvent delivery system) for the e.g. reequilibration of the separation unit B while connecting the separation unit B with Outlet B=W.

c) feeding the composition onto a separation unit A2 (e.g. cation exchange material) through inlet A (e.g. solvent delivery system) wherein the composition is at a first pH and conductivity enabling target molecule (e.g. antibody) to be bound to separation unit A2 (e.g. cation exchange media) and not bound molecules to be withdrawn through outlet B, while the separation unit A1 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A1 with buffer A steps, where the named washing, reequilibration steps are done while connecting the separation unit A1 with Outlet A1-W and the named elution step is done while connecting the separation unit A1 with separation unit B (e.g. anion exchange media) directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B steps where feeding, washing and reequilibration steps are done while connecting the separation unit B with Outlet B-W and elution step is done while connecting the separation unit B with Outlet B-P to withdraw the purified target molecule (e.g. antibody).

d) feeding the composition onto a separation unit A2 (e.g. cation exchange material) through inlet A (e.g. solvent delivery system) wherein the composition is at a first pH and conductivity enabling target molecule (e.g. antibody) to be bound to separation unit A2 to high bound target molecule amounts without reasonable losses while directly connecting the separation unit A2 with separation unit A1 to enable the capture of the starting to leach target molecule from the separation unit A2 to be bound to separation unit A1 where separation unit A1 is connected with outlet A1-W to withdraw the unbound molecules, while a separation unit B is connected with inlet C (e.g. solvent delivery system) for the e.g. reequilibration of the separation unit B step while connecting the separation unit B with Outlet B-W.) inline diluting the eluting antibody solution with a third buffer in order to bind the eluting antibody on the anion exchange material;

Preferably, steps a) to d) are performed sequentially, that means they are performed in the same order two or more times.

In one embodiment, the method comprises CIEX capture, high through put and AIEX polishing.

In an exemplary procedure comprising CIEX capture, high through put, and AIEX polishing, the method according to the invention is performed by a) feeding the sample onto a separation column A1 (e.g. cation exchange material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. cation exchange material) through inlet B (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing the bound target molecule with a buffer A at a first pH, elution of the bound target molecule with buffer B at a second pH and reequilibration of the separation unit A with buffer A. The washing and reequilibration steps are done while connecting the separation unit A1 with Outlet A1-W and the named elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

Preferably, steps a) to f) are performed sequentially, that means they are performed in the same order two or more times.

In one embodiment, the method comprises CIEX capture, virus inactivation and AIEX polishing (bind & elute or flow through).

In an exemplary procedure comprising CIEX capture, virus inactivation and AIEX polishing, the method according to the invention is performed by a) feeding the composition onto a separation unit A1 (e.g. cation exchange material) through inlet A (e.g. solvent delivery system) wherein the composition is at a first pH and conductivity enabling target molecule (e.g. antibody) to be bound to separation unit A1 (e.g. cation exchange media) and not bound molecules to be withdrawn through outlet A1-W, while the separation unit A2 (e.g. cation exchange material) is connected with inlet B (e.g. solvent delivery system) for the washing the bound target molecule with a buffer A at a first pH, virus inactivation with a buffer C at a second pH, elution of the bound target molecule with buffer B at a third pH and reequilibration of the separation unit A2 with buffer A steps, where the named washing, virus inactivation and reequilibration steps are done while connecting the separation unit A2 with Outlet A2-W and the named elution step is done while connecting the separation unit A2 with separation unit B (e.g. anion exchange media) directly to transfer the target molecule to separation unit B, while a separation unit B is connected with inlet C (e.g. solvent delivery system) for the feeding of target molecule from the separation unit A2 at the conditions that enable the target molecule to be bound to separation unit B, washing with buffer B, elution of the target molecule with buffer A and reequilibration with buffer B steps where feeding, washing and reequilibration steps are done while connecting the separation unit B with Outlet B-W and elution step is done while connecting the separation unit B with Outlet B-P to withdraw the purified target molecule (e.g. antibody).

b) feeding the composition onto a separation unit A2 (e.g. cation exchange material) through inlet A (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing the bound target molecule with a buffer A at a first pH, virus inactivation with a buffer C at a second pH, elution of the bound target molecule with buffer B at a third pH and reequilibration of the separation unit A1 with buffer A steps, where the named washing, virus inactivation and reequilibration steps are done while connecting the separation unit A1 with Outlet A1-W and the named elution step is done while connecting the separation unit A1 with separation unit B (e.g. anion exchange media) directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B steps where feeding, washing and reequilibration steps are done while connecting the separation unit B with Outlet B-W and elution step is done while connecting the separation unit B with Outlet B-P to withdraw the purified target molecule (e.g. antibody).

Preferably, steps a) to b) are performed sequentially, that means they are performed in the same order two or more times.

In one embodiment, the method comprises CIEX capture, high through put, virus inactivation and AIEX polishing. In an exemplary procedure comprising CIEX capture, high through put, virus inactivation and AIEX polishing, the method according to the invention is performed by a) feeding the sample onto a separation column A1 (e.g. cation exchange material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. cation exchange material) is connected with inlet A (e.g. solvent delivery system) for the washing of the bound target molecule with a buffer A at a first pH, virus inactivation step with a virus inactivation buffer, elution of the bound target molecule with buffer B at a second pH and reequilibration of the separation column A2 with buffer A. The washing, virus inactivation and reequilibration steps are done while connecting the separation unit A2 with outlet A2-W and the elution step is done while connecting the separation unit A2 with separation unit B (e.g. anion exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. cation exchange material) through inlet B (e.g. solvent delivery system) wherein the composition is at a first pH and conductivity enabling target molecule (e.g. antibody) to be bound to separation unit A2 (e.g. cation exchange media) and not bound molecules to be withdrawn through outlet A2-W, while the separation unit A1 (e.g. cation exchange material) is connected with inlet B (e.g. solvent delivery system) for the washing of the bound target molecule with a buffer A at a first pH, virus inactivation step with a virus inactivation buffer, elution of the bound target molecule with buffer B at a second pH and reequilibration of the separation column A1 with buffer A. The washing, virus inactivation and reequilibration steps are done while connecting the separation unit A1 with outlet A1-W and the elution step is done while connecting the separation unit A1 with separation unit B (e.g. anion exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

Preferably, steps a) to f) are performed sequentially, that means they are performed in the same order two or more times.

In one embodiment, the method comprises ProtA capture, CIEX polishing (bind & elute) and virus inactivation. In an exemplary procedure comprising ProtA capture, CIEX polishing (bind & elute) and virus inanctivation, the method according to the invention is performed by performing the following steps:

a) feeding the composition onto a separation unit A1 (e.g. ProtA column affinity matrix) through inlet A (e.g. solvent delivery system) wherein the composition is at a first pH and conductivity enabling target molecule (e.g. antibody) to be bound to separation unit A1 and not bound molecules to be withdrawn through outlet A1-W, while the separation unit A2 (e.g. ProtA material) is connected with inlet B (e.g. solvent delivery system) for the washing the bound target molecule with a buffer A at a first pH, elution of the bound target molecule with buffer B at a second pH and reequilibration of the separation unit A1 with buffer A steps, where the named washing, reequilibration steps are done while connecting the separation unit A2 with Outlet A2-W and the named elution step is done while connecting the separation unit A2 with separation unit B (e.g. cation exchange media) directly to transfer the target molecule to separation unit B, while a separation unit B is connected with inlet C (e.g. solvent delivery system) for the feeding of target molecule from the separation unit A2 at the conditions that enable the target molecule to be bound to separation unit B, washing with buffer B, virus inactivation with buffer C and elution of the target molecule with buffer A and reequilibration with buffer B steps where feeding, washing, virus inactivation and reequilibration steps are done while connecting the separation unit B with Outlet B-W and elution step is done while connecting the separation unit B with Outlet B-P to withdraw the purified target molecule (e.g. antibody).

b) feeding the composition onto a separation unit A1 through inlet A (e.g. solvent delivery system) wherein the composition is at a first pH and conductivity enabling target molecule (e.g. antibody) to be bound to separation unit A1 to high bound target molecule amounts without reasonable losses while directly connecting the separation unit A1 with separation unit A2 to enable the capture of the starting to leach target molecule from the separation unit A1 to be bound to separation unit A2 where separation unit A2 is connected with outlet A2-W to withdraw the unbound molecules, while a separation unit B is connected with inlet C (e.g. solvent delivery system) for the e.g. reequilibration of the separation unit B while connecting the separation unit B with Outlet B-W.

c) feeding the composition onto a separation unit A2 (e.g. ProtA material) through inlet A (e.g. solvent delivery system) wherein the composition is at a first pH and conductivity enabling target molecule (e.g. antibody) to be bound to separation unit A2 (e.g. ProtA media) and not bound molecules to be withdrawn through outlet A2-W, while the separation unit A1 (e.g. affinity material) is connected with inlet B (e.g. solvent delivery system) for the washing the bound target molecule with a buffer A at a first pH, elution of the bound target molecule with buffer B at a second pH and reequilibration of the separation unit A1 with buffer A steps, where the named washing, and reequilibration steps are done while connecting the separation unit A1 with outlet A and the named elution step is done while connecting the separation unit A1 with separation unit B (e.g. cation exchange media) directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, virus inactivation with a buffer C at a third pH, elution of the target molecule with buffer A and reequilibration with buffer B steps where feeding, washing, virus inactivation and reequilibration steps are done while connecting the separation unit B with Outlet B-W and elution step is done while connecting the separation unit B with Outlet B-P to withdraw the purified target molecule (e.g. antibody).

d) feeding the composition onto a separation unit A2 (e.g. affinity material) through inlet A (e.g. solvent delivery system) wherein the composition is at a first pH and conductivity enabling target molecule (e.g. antibody) to be bound to separation unit A2 to high bound target molecule amounts without reasonable losses while directly connecting the separation unit A2 with separation unit A1 to enable the capture of the starting to leach target molecule from the separation unit A2 to be bound to separation unit A1 where separation unit A1 is connected with outlet A1-W to withdraw the unbound molecules, while a separation unit B is connected with inlet C (e.g. solvent delivery system) for the e.g. reequilibration of the separation unit B while connecting the separation unit B with Outlet B-W.

Preferably, steps a) to d) are performed sequentially, that means they are performed in the same order two or more times.

In one embodiment, the method comprises ProtA capture, high through put and CIEX polishing. In an exemplary procedure comprising ProtA capture, high through put, and CIEX polishing, the method according to the invention is performed by a) feeding the sample onto a separation column A1 (e.g. ProtA affinity matrix) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. ProtA affinity matrix) is connected with inlet A (e.g. solvent delivery system) for the washing of the bound target molecule with a buffer A at a first pH, virus inactivation step with a virus inactivation buffer, elution of the bound target molecule with buffer B at a second pH and reequilibration of the separation column A2 with buffer A. The washing, virus inactivation and reequilibration steps are done while connecting the separation unit A2 with outlet A2-W and the elution step is done while connecting the separation unit A2 with separation unit B (e.g. cation exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. ProtA affinity matrix) through inlet B (e.g. solvent delivery system) wherein the composition is at a first pH and conductivity enabling target molecule (e.g. antibody) to be bound to separation unit A2 (e.g. ProtA affinity matrix) and not bound molecules to be withdrawn through outlet A2-W, while the separation unit A1 (e.g. ProtA affinity matrix) is connected with inlet B (e.g. solvent delivery system) for the washing of the bound target molecule with a buffer A at a first pH, virus inactivation step with a virus inactivation buffer, elution of the bound target molecule with buffer B at a second pH and reequilibration of the separation column A2 with buffer A. The washing, virus inactivation and reequilibration steps are done while connecting the separation unit A1 with outlet A1-W and the elution step is done while connecting the separation unit A1 with separation unit B (e.g. cation exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, elution of the target molecule with buffer A and reequilibration with buffer B. The feeding, washing and reequilibration steps are done while connecting the separation unit B with Outlet B-W and elution step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

Preferably, steps a) to f) are performed sequentially, that means they are performed in the same order two or more times.

In one embodiment, the method comprises ProtA capture in the bind-elute mode, high through put and mixed mode polishing in the flow-through mode. In an exemplary procedure comprising ProtA capture, high through put, and mixed mode polishing, the method according to the invention is performed by a) feeding the sample onto a separation column A1 (e.g. ProtA affinity matrix) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. ProtA affinity matrix) is connected with inlet A (e.g. solvent delivery system) for the washing of the bound target molecule with a buffer A at a first pH, virus inactivation step with a virus inactivation buffer, elution of the bound target molecule with buffer B at a second pH and reequilibration of the separation column A2 with buffer A. The washing, virus inactivation and reequilibration steps are done while connecting the separation unit A2 with outlet A2-W and the elution step is done while connecting the separation unit A2 with separation unit B (e.g. mixed mode media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be weakly bound or unbound to separation unit B, followed by the reequilibration with buffer B. The reequilibration steps are done while connecting the separation unit B with Outlet B-W and feeding step is done while connecting the separation unit B with Outlet B-P to withdraw the purified target molecule (e.g. antibody).

b) when the loading is nearly finished on column A1, it is further loaded through inlet B (e.g. solvent delivery system) wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. ProtA affinity matrix) through inlet B (e.g. solvent delivery system) wherein the composition is at a first pH and conductivity enabling target molecule (e.g. antibody) to be bound to separation unit A2 (e.g. ProtA affinity matrix) and not bound molecules to be withdrawn through outlet A2-W, while the separation unit A1 (e.g. ProtA affinity matrix) is connected with inlet B (e.g. solvent delivery system) for the washing of the bound target molecule with a buffer A at a first pH, virus inactivation step with a virus inactivation buffer, elution of the bound target molecule with buffer B at a second pH and reequilibration of the separation column A2 with buffer A. The washing, virus inactivation and reequilibration steps are done while connecting the separation unit A1 with outlet A1-W and the elution step is done while connecting the separation unit A1 with separation unit B (e.g. cation exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be weakly bound or unbound to separation unit B, following by the reequilibration with buffer B. The reequilibration steps are done while connecting the separation unit B with Outlet B-W and feeding step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

Preferably, steps a) to f) are performed sequentially, that means they are performed in the same order two or more times.

In one embodiment, the method comprises AIEX capture, high through put, CIEX polishing (bind & elute) and virus inactivation. In an exemplary procedure comprising AIEX capture, high through put, CIEX polishing (bind & elute) and virus inactivation, the method according to the invention is performed by a) feeding the sample onto a separation column A1 (e.g. anion exchange material) through inlet B (e.g. solvent delivery system) wherein the sample is at a first pH and conductivity enabling the target molecule (e.g. antibody) to be bound to separation unit A1 and not bound molecules to be withdrawn through outlet A1-W, while the separation column A2 (e.g. anion exchange material) is connected with inlet A (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with outlet A2-W and the elution step is done while connecting the separation unit A2 with separation unit B (e.g. cation exchange media) through the connecting line C-P directly to transfer the target molecule to separation unit B, while the separation unit B is connected with inlet C (e.g. solvent delivery system) for the feeding of target molecule from the separation unit A2 at the conditions that enable the target molecule to be bound to separation unit B, followed by washing with buffer B, virus inactivation step with a virus inactivation buffer, elution of the target molecule with buffer A and reequilibration with buffer B. The feeding, washing, virus inactivation and reequilibration steps are done while connecting the separation unit B with Outlet B-W and elution step is done while connecting the separation unit B with Outlet B-P to withdraw the purified target molecule (e.g. antibody).

b) when the loading is nearly finished on column A1, it is further loaded through inlet B (e.g. solvent delivery system)

wherein the sample is at a first pH and conductivity enabling the target molecule (e.g. antibody) to be bound to separation unit A1 and not bound target molecule is transferred to column A2 directly through the connecting line F-F and the not bound molecules to be withdrawn through outlet A2-W. At the same time column B is connected to inlet C for reequilibration.

c) when the loading of separation unit A1 is finished, the unbound target molecule from separation unit A1 is washed using inlet A while connecting the separation unit A1 with a connecting line W-F with separation unit A2, that is being loaded through inlet B. As soon as too little of the target molecule from separation unit A1 is detected, connection is interrupted and the column A1 outlet is switched to outlet position A1-W to withdraw the unbound molecules, meanwhile the target molecule is further loaded on separation unit A2 and not bound molecules withdraw through outlet A2-W.

d) feeding the sample onto a separation unit A2 (e.g. anion exchange material) through inlet B (e.g. solvent delivery system) wherein the composition is at a first pH and conductivity enabling target molecule (e.g. antibody) to be bound to separation unit A2 (e.g. anion exchange material) and not bound molecules to be withdrawn through outlet A2-W, while the separation unit A1 (e.g. anion exchange material) is connected with inlet B (e.g. solvent delivery system) for the washing of the bound target molecule with a buffer A at a first pH, elution of the bound target molecule with buffer B at a second pH and reequilibration of the separation column A2 with buffer A. The washing and reequilibration steps are done while connecting the separation unit A2 with separation unit B (e.g. cation exchange media) through connecting line C-P directly to transfer the target molecule to separation unit B, while a separation unit B is connected with inlet C (e.g. solvent delivery system) for the feeding of target molecule from the separation unit A1 at the conditions that enable the target molecule to be bound to separation unit B, washing with buffer B, virus inactivation step with a virus inactivation buffer, elution of the target molecule with buffer A and reequilibration with buffer B. The feeding, washing, virus inactivation and reequilibration steps are done while connecting the separation unit B with Outlet B-W and elution step is done while connecting the separation unit B with Outlet B-P to withdraw the purified target molecule (e.g. antibody).

e) when the loading is nearly finished on column A2, it is further loaded through inlet B (e.g. solvent delivery system) wherein the sample is at a first pH and conductivity enabling the target molecule (e.g. antibody) to be bound to separation unit A2 and not bound target molecule is transferred to column A1 directly through the connecting line F-F and the not bound molecules to be withdrawn through outlet A1-W. At the same time column B is connected to inlet C for reequilibration.

f) when the loading of separation unit A2 is finished, the unbound target molecule from separation unit A2 is washed using inlet A while connecting the separation unit A2 with a connecting line W-F with separation unit A1, that is being loaded through inlet B. As soon as too little of the target molecule from separation unit A2 is detected, connection is interrupted and the column A2 outlet is switched to outlet position A2-W to withdraw the unbound molecules, meanwhile the target molecule is further loaded on separation unit A1 and not bound molecules withdraw through outlet A1-W.

Preferably, steps a) to f) are performed sequentially, that means they are performed in the same order two or more times.

The apparatus and the method according to the present invention for the first time offer the possibility for a time saving two step chromatographic procedure for the purification of target molecules like antibodies. If unique selectivity is needed, the procedure is performed using e.g. affinity capture and cation exchange polishing, and if an affinity sorbent is rather avoided, the purification process is done via the exchange of the affinity chromatography step (Prot A) with ion exchange chromatography using cation capture and anion polishing or anion capture and cation polishing. This has the advantage of longer resin usage times, cleaning in place, inexpensive resins and is applicable to multiple biopharmaceutical compounds.

The current purification process optimization via the virus inactivation on column enables to shorten the processing time. Often the processing time is reduced to half of the time or less.

The entire disclosures of all applications, patents, and publications cited above and below and of corresponding EP application EP 11008021.5, filed Oct. 4, 2011 and of corresponding U.S. provisional application 61/666,338 filed Jun. 29, 2012 are hereby incorporated by reference.

EXAMPLES

The following examples represent practical applications of the invention. 1.

The monoclonal antibody cell culture solution, which had 0.9 mg/ml monoclonal antibody composing a fraction of 17% of all components in the solution (according to analytical SEC), where HCP amount was 600000 ng/mg antibody (according to immunoenzymetric assay SP 2/0), was purified on the Eshmuno™ S resin in first mode (resembling columns A1 and A2) and Capto™ Adhere in the second mode (resembling column B) under the following conditions. Chromatography conditions: first mode—33.5 ml Eshmuno™ S resin was packed in a 16×150 mm column; the column was then equilibrated with 25 mM phosphate buffer containing 20 mM NaCl, pH 4.5 at 30 ml/min (1000 cm/hr). Second mode—33.5 ml Capto™ Adhere resin was packed in a 16×150 mm column; the column was then equilibrated with 50 mM TRIS buffer containing 20 mM NaCl, pH 9 at 15 ml/min (500 cm/hr). To prepare the sample: monoclonal antibody cell culture solution was diluted 1:2 with water, 0.5% caprylic acid was added while stirring for 10 minutes. The formed precipitate was allowed to settle for another 20 minutes. The obtained solution was filtered through a 0.45 μm filter and titrated to pH 5.5, conductivity at about 6 mS/cm. A 3000 ml sample was loaded on the Eshmuno™ S column and the column was subsequently washed with 25 mM acetate, pH 4.6. Then the column was washed with 25 mM phosphate, pH 6.3. The flow rate was then reduced to 300 cm/hr (10 ml/min) and antibody was eluted with 10 column volumes in a linear gradient to 50 mM TRIS, 20 mM NaCl, pH ~7.5 (cond. about 3.3 mS/cm) onto the Capto™ Adhere column. Inline dilution with 50 mM TRIS buffer was used to increase the pH value of the eluting solution to 8.5. The Capto™ Adhere column was then subsequently washed with a 50 mM TRIS buffer, pH 8.5, and the antibody was eluted with 10 column volumes in a linear gradient to 10 mM citric acid, 10 mM phosphate and 20 mM NaCl, pH 3.5. The eluted fraction contained 3.2 mg/ml antibody, that composed 99.9% of all components (according to analytical SEC), where HCP amount was 33 ng/mg antibody (according to immunoenzymetric assay SP 2/0). Following elution, both of the columns were stripped with 1M NaCl, then 1 M NaOH.

2. Cation Capture+Anion Flow Through

The monoclonal antibody cell culture solution, which had 0.9 mg/ml monoclonal antibody composing a fraction of 17% of all components in the solution (according to analytical SEC), where HCP amount was 600000 ng/mg antibody (according to immunoenzymetric assay SP 2/0), was purified on the Eshmuno™ S resin in first mode (resembling columns A1 and A2) and Fractogel™ TMAE (M) in the second mode (resembling column B) under the following conditions. Chromatography conditions: first mode—33.5 ml Eshmuno™ S resin was packed in a 16×150 mm column; the column was then equilibrated with 25 mM phosphate buffer containing 20 mM NaCl, pH 4.5 at 30 ml/min (1000 cm/hr). Second mode—33.5 ml Fractogel™ TMAE (M) resin was packed in a 16×150 mm column; the column was then equilibrated with 50 mM TRIS buffer containing 20 mM NaCl, pH 8.6 at 15 ml/min (500 cm/hr). To prepare the sample: monoclonal antibody cell culture solution was diluted 1:2 with water, 0.5% caprylic acid was added while stirring for 10 minutes. The formed precipitate was allowed to settle for another 20 minutes. The obtained solution was filtered through a 0.45 μm filter and titrated to pH 5.5, conductivity at about 6 mS/cm. A 3000 ml sample was loaded on the Eshmuno™ S column and the column was subsequently washed with 25 mM acetate, pH 4.6. Then the column was washed with 25 mM phosphate, pH 6.3. The flow rate was then reduced to 300 cm/hr (10 ml/min) and antibody was eluted with 10 column volumes with 100 mM TRIS, 20 mM NaCl, pH ~8.5 (cond. about 4.6 mS/cm) onto the Fractogel™ TMAE (M) column. Inline dilution with 100 mM TRIS buffer was used to keep the pH value of the eluting solution to 8.6. The Fractogel™ TMAE (M) column was then subsequently washed with a 50 mM TRIS buffer, pH 8.5, and the rest antibody was washed out with 2 column volumes. The flow through fraction contained 2.8 mg/ml antibody, that composed 99.9% of all components (according to analytical SEC), where HCP amount was 30 ng/mg antibody (according to immunoenzymetric assay SP 2/0). Following elution for Eshmuno™ S and washing for Fractogel™ TMAE (M) column, both of the columns were stripped with 1M NaCl, then 1 M NaOH.

3. ProtA Capture+Cation Polishing

The monoclonal antibody cell culture solution, which had 0.9 mg/ml monoclonal antibody composing a fraction of 17% of all components in the solution (according to analytical SEC), where HCP amount was 600000 ng/mg antibody (according to immunoenzymetric assay SP 2/0), was purified on the Prosep® Ultra Plus resin in first mode (resembling columns A1 and A2) and Eshmuno™ S in the second mode (resembling column B) under the following conditions. Chromatography conditions: first mode—33.5 ml Prosep Ultra® Plus resin was packed in a 16×150 mm column; the column was then equilibrated with 25 mM phosphate buffer containing 20 mM NaCl, pH 7.2 at 30 ml/min (1000 cm/hr). Second mode—33.5 ml Eshmuno™ S resin was packed in a 16×150 mm column; the column was then equilibrated with 10 mM glycine buffer containing 20 mM NaCl, pH 4.0 at 30 ml/min (1000 cm/hr). To prepare the sample: monoclonal antibody cell culture solution was filtered through a 0.45 μm filter and titrated to pH 7.2, conductivity at about 16 mS/cm. A 1500 ml sample was loaded on the Prosep® Ultra Plus column and the column was subsequently washed with 25 mM phosphate buffer containing 20 mM NaCl, pH 7.2. The flow rate was then reduced to 300 cm/hr (10 ml/min) and antibody was eluted with 10 column volumes with 10 mM glycine buffer containing 20 mM NaCl, pH ~5.0, (cond. about 3.6 mS/cm) onto the Eshmuno™ S column. Inline dilution with 10 mM glycine buffer was used to keep the pH value of the eluting solution to ~5.5. The Eshmuno™ S column was then subsequently washed with a 10 mM glycine buffer, pH 4.0, and the antibody was eluted with 10 column volumes in a linear gradient to 25 mM phosphate buffer containing 20 mM NaCl, pH 7.2. The elution fraction contained 4.5 mg/ml antibody, that composed 99.9% of all components (according to analytical SEC), where HCP amount was 40 ng/mg antibody (according to immunoenzymetric assay SP 2/0). Following elution, the Prosep Ultra Plus column was stripped with 0.15M H3PO4, and Eshmuno™ S column with 1M NaCl and then 1 M NaOH.

4. ProtA Capture+Mixed Ion Exchange Flow Through

The monoclonal antibody cell culture solution, which had 1.25 mg/ml monoclonal antibody composing a fraction of 10% of all components in the solution (according to analytical SEC), where HCP amount was 250000 ng/mg antibody (according to immunoenzymetric assay CHO), was purified on the Prosep®-vA High Capacity resin in first mode (resembling columns A1 and A2) and Eshmuno™ S and Fractogel® TMAE Hicap in the second mode (resembling column B) under the following conditions. Chromatography conditions: first mode—17.3 ml Prosep®-vA High Capacity resin was packed in a 16×8.6 mm column; the column was then equilibrated with 25 mM TRIS buffer containing 20 mM NaCl, pH 7.0 at 30 ml/min (1000 cm/hr). Second mode—16.75 ml Eshmuno™ S resin was packed in a 16×75 mm column and 16.75 ml Fractogel® TMAE Hicap resin was packed in a 16×75 mm column, combining both columns in one separation unit; this separation unit was then equilibrated with 25 mM TRIS buffer containing 20 mM NaCl, pH 7.4 at 30 ml/min (1000 cm/hr). To prepare the sample: monoclonal antibody cell culture solution was filtered through a depth filter having 0.8 μm and 0.2 μm pores and titrated to pH 7.2, conductivity at about 18 mS/cm. A 220 ml sample was loaded on the Prosep®-vA High Capacity column and the column was subsequently washed with 25 mM TRIS buffer containing 500 mM NaCl, pH 7.2. The flow rate was then reduced to 300 cm/hr (10 ml/min) and antibody was eluted with 10 column volumes with 10 mM glycine buffer containing 20 mM NaCl, pH ~4.0, (cond. about 3.6 mS/cm) onto the Eshmuno™ S/Fractogel® TMAE Hicap column. Inline dilution with 100 mM TRIS buffer was used to keep the pH value of the eluting solution to ~7.4. The flowing through fraction contained 5.67 mg/ml antibody, that composed 99.9% of all components (according to analytical SEC), where HCP amount was <50 ng/mg antibody (according to immunoenzymetric assay CHO). Following elution, the Prosep®-vA High Capacity column was stripped with 0.15M H3PO4, and Eshmuno™ S/Fractogel® TMAE Hicap column with 1M NaCl and then 1 M NaOH.

5. ProtA Capture+Mixed Mode Flow Through

The monoclonal antibody cell culture solution, which had 1.25 mg/ml monoclonal antibody composing a fraction of 10% of all components in the solution (according to analytical SEC), where HCP amount was 250000 ng/mg antibody (according to immunoenzymetric assay CHO), was purified on the Prosep®-vA High Capacity resin in first mode (resembling columns A1 and A2) and Eshmuno™ S and Fractogel® TMAE Hicap in the second mode (resembling column B) under the following conditions. Chromatography conditions: first mode—17.3 ml Prosep®-vA High Capacity resin was packed in a 16×8.6 mm column; the column was then equilibrated with 25 mM TRIS buffer containing 20 mM NaCl, pH 7.0 at 30 ml/min (1000 cm/hr). Second mode—16.75 ml Capto™ Adhere resin was packed in a 16×75 mm column and 16.75 ml Capto™ MMC resin was packed in a 16×75 mm column, combining both columns in one separation unit; this separation unit was then equilibrated with 25 mM TRIS buffer containing 50 mM NaCl, pH 7.4 at 30 ml/min (1000 cm/hr). To prepare the sample: monoclonal antibody cell culture solution was filtered through a depth filter having 0.8 μm and 0.2 μm pores and titrated to pH 7.2, conductivity at about 18 mS/cm. A 220 ml sample was loaded on the Prosep®-vA High Capacity column and the column was subsequently washed with 25 mM TRIS buffer containing 500 mM NaCl, pH 7.2. The flow rate was then reduced to 300 cm/hr (10 ml/min) and antibody was eluted with 10 column volumes with 50 mM glycine buffer containing 50 mM NaCl, pH ~4.0, (cond. about 7.6 mS/cm) onto the Capto™ Adhere/Capto™ MMC column. Inline dilution with 100 mM TRIS buffer was used to keep the pH value of the eluting solution to ~7.2. The flowing through fraction contained 6.15 mg/ml antibody, that composed 99.9% of all components (according to analytical SEC), where HCP amount was <30 ng/mg antibody (according to immunoenzymetric assay CHO). Following elution, the Prosep®-vA High Capacity column was stripped with 0.15M H3PO4, and Capto™ Adhere/Capto™ MMC column with 1M NaCl and then 1 M NaOH.

The invention claimed is:

1. A method of purifying a target molecule from one or more impurities in only one sample using an apparatus comprising two separation units A1 and A2 both having the same chromatography matrix and a separation unit B having a chromatography matrix which differs from the chromatography matrix of separation units A1 and A2, all separation units having a fluid inlet and a fluid outlet, whereby there is at least fluid connection between the fluid outlet of separation unit A1 and the fluid inlet of separation unit B and fluid connection between the fluid outlet of separation unit A2 and the fluid inlet of separation unit B at least one valve in the fluid connection between separation units A1 and A2 and separation unit B that allows to switch between fluid communication between the outlet of separation unit A1 and the fluid inlet of separation unit B and fluid communication between the outlet of separation unit A2 and the fluid inlet of separation unit B, at least two buffer reservoirs and at least two pumps a reservoir containing sample solution that is in fluid connection with the inlets of separation units A1 and A2, the method comprising:

alternately loading portions of the sample on the separation units A1 and A2 so that while the sample is loaded on separation unit A1 wherein the sample is at a first pH and conductivity enabling the target molecule to be bound to separation unit A1, separation unit A2 is at least part of that time in fluid communication with separation unit B so that the target molecule loaded on separation unit A2 is eluted onto separation unit B and separation unit A2 is re-equilibrated and while the sample is loaded on separation unit A2 wherein the sample is at a first pH and conductivity enabling the target molecule to be bound to separation unit A2, separation unit A1 is at least part of that time in fluid communication with separation unit B so that the target molecule loaded on separation unit A1 is eluted onto separation unit B and separation unit A1 is re-equilibrated, recovering the target molecule from the fluid outlet of separation unit B.

2. Method according to claim 1, wherein the target molecule is an antibody.

3. Method according to claim 1, wherein while loading the sample onto separation unit A1 the fluid outlet of separation unit A1 is at least part of that time in fluid communication with the fluid inlet of separation unit A2 to enable capturing of the target molecule that is starting to leach from the separation unit A1 to be bound to separation unit A2 and while loading the sample onto separation unit A2 the fluid outlet of separation unit A2 is at least part of that time in fluid communication with the fluid inlet of separation unit A1 to enable capturing of the target molecule that is starting to leach from the separation unit A2 to be bound to separation unit A1.

4. Method according to claim 1, wherein a virus inactivation buffer is pumped through separation unit A1 after loading separation unit A1 with the target molecule and through separation unit A2 after loading separation unit A2 with the target molecule.

5. Method according to claim 1, wherein while washing an unbound sample from the separation unit A1, separation unit A2 is at least part of that time in fluid communication with the reservoir containing sample solution and separation unit A1 and while washing an unbound sample from the separation unit A2, separation unit A1 is at least part of that time in fluid communication with the reservoir containing sample solution and separation unit A2.

6. Method according to claim 1, wherein the sample is a clarified sample.

* * * * *